US009040643B2

(12) United States Patent
Buck et al.

(10) Patent No.: US 9,040,643 B2
(45) Date of Patent: May 26, 2015

(54) BRIDGED METALLOCENE CATALYST SYSTEMS WITH SWITCHABLE HYDROGEN AND COMONOMER EFFECTS

(71) Applicant: Chevron Phillips Chemical Company LP, The Woodlands, TX (US)

(72) Inventors: Richard M. Buck, Bartlesville, OK (US); Qing Yang, Bartlesville, OK (US); Albert P. Masino, Tulsa, OK (US); Christopher E. Wittner, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/109,997

(22) Filed: Dec. 18, 2013

(65) Prior Publication Data

US 2014/0107301 A1    Apr. 17, 2014

Related U.S. Application Data

(62) Division of application No. 12/899,753, filed on Oct. 7, 2010, now Pat. No. 8,637,616.

(51) Int. Cl.
| | | |
|---|---|---|
| *C08F 4/642* | (2006.01) | |
| *C08F 4/6592* | (2006.01) | |
| *C08F 210/02* | (2006.01) | |
| *C08F 210/16* | (2006.01) | |
| *C08F 4/659* | (2006.01) | |
| *C08F 4/639* | (2006.01) | |
| *C08F 110/02* | (2006.01) | |

(52) U.S. Cl.
CPC ......... *C08F 4/65927* (2013.01); *C08F 4/65908* (2013.01); *C08F 4/63912* (2013.01); *C08F 4/63916* (2013.01); *C08F 110/02* (2013.01); *C08F 210/16* (2013.01)

(58) Field of Classification Search
CPC ............. C08F 4/65908; C08F 4/65912; C08F 4/65927; C08F 210/00; C08F 4/65916; C08F 210/02; C08F 210/16
USPC .......... 502/103, 152; 526/133, 134, 160, 165, 526/348, 943
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,060,480 A | 11/1977 | Reed et al. |
| 4,452,910 A | 6/1984 | Hopkins et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,252,677 A | 10/1993 | Tomita et al. |
| 5,346,925 A | 9/1994 | Sugano et al. |
| 5,352,749 A | 10/1994 | Dechellis et al. |
| 5,376,611 A | 12/1994 | Shveima |
| 5,436,304 A | 7/1995 | Griffin et al. |
| 5,441,920 A | 8/1995 | Welborn, Jr. |
| 5,444,125 A | 8/1995 | Tomita et al. |
| 5,455,314 A | 10/1995 | Burns et al. |
| 5,468,781 A | 11/1995 | Sugano et al. |
| 5,565,175 A | 10/1996 | Hottovy et al. |
| 5,575,979 A | 11/1996 | Hanson |
| 5,576,259 A | 11/1996 | Hasegawa et al. |
| 5,597,935 A | 1/1997 | Jordan et al. |
| 5,623,022 A | 4/1997 | Sugano et al. |
| 5,739,220 A | 4/1998 | Shamshoum et al. |
| 5,807,938 A | 9/1998 | Kaneko et al. |
| 5,919,983 A | 7/1999 | Rosen |
| 5,948,873 A | 9/1999 | Santi et al. |
| 5,998,643 A | 12/1999 | Jordan et al. |
| 6,010,974 A | 1/2000 | Kim et al. |
| 6,107,230 A | 8/2000 | McDaniel et al. |
| 6,133,490 A | 10/2000 | Toyoda et al. |
| 6,153,777 A | 11/2000 | Jordan et al. |
| 6,165,929 A | 12/2000 | McDaniel et al. |
| 6,194,114 B1 | 2/2001 | Toyoda et al. |
| 6,207,608 B1 | 3/2001 | Jordan et al. |
| 6,218,469 B1 | 4/2001 | Morizono et al. |
| 6,239,235 B1 | 5/2001 | Hottovy et al. |
| 6,255,246 B1 | 7/2001 | Devore et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |

(Continued)

FOREIGN PATENT DOCUMENTS

| | | |
|---|---|---|
| CN | 1276386 A | 12/2000 |
| CN | 1289784 A | 4/2001 |

(Continued)

OTHER PUBLICATIONS

Arnett et al., "Zero-Shear Viscosity of Some Ethyl Branched Paraffinic Model Polymers," Journal of Physical Chemistry, 1980, 84(6), pp. 649-652.
Biagini et al., "Synthesis and crystal structure of an ansa-disilylene-bridged zirconocene complex," Journal of Chemical Crystallography, 2001, 30(11), pp. 699-703.
Bird et al., "Dynamics of Polymeric Liquids," vol. 1, Fluid Mechanics, 2nd Edition, John Wiley & Sons, 1987, 3 pages.
Brenner et al., "Mixed Chloro(dialkylamido) Complexes of Zirconium and Hafnium," Z. anorg. Allg. Chem., 1995, 621, pp. 2021-2024.
Buck et al., "Control of *ansa*-Zirconocene Stereochemistry by Reversible Exchange of Cyclopentadienyl and Chloride Ligands," J. Am. Chem. Soc., 2007, 129, pp. 3468-3469.

(Continued)

*Primary Examiner* — Caixia Lu
(74) *Attorney, Agent, or Firm* — Merchant & Gould

(57) ABSTRACT

The present invention provides polymerization processes utilizing an ansa-metallocene catalyst system for the production of olefin polymers. Polymers produced from the polymerization processes have properties that vary based upon the presence or the absence of hydrogen and/or comonomer in the polymerization process.

24 Claims, 11 Drawing Sheets

(56) References Cited

U.S. PATENT DOCUMENTS

| | | |
|---|---|---|
| 6,303,727 B1 | 10/2001 | Maeda et al. |
| 6,310,164 B1 | 10/2001 | Morizono et al. |
| 6,313,184 B1 | 11/2001 | Sasaki et al. |
| 6,316,553 B1 | 11/2001 | McDaniel et al. |
| 6,344,577 B1 | 2/2002 | Ewen |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,451,419 B1 | 9/2002 | Tsurugai et al. |
| 6,524,987 B1 | 2/2003 | Collis et al. |
| 6,531,552 B2 | 3/2003 | Nakano et al. |
| 6,548,441 B1 | 4/2003 | McDaniel et al. |
| 6,548,442 B1 | 4/2003 | McDaniel et al. |
| 6,562,918 B1 | 5/2003 | Minami et al. |
| 6,562,921 B1 | 5/2003 | Wenzel et al. |
| 6,576,583 B1 | 6/2003 | McDaniel et al. |
| 6,579,935 B1 | 6/2003 | Tanaka et al. |
| 6,613,712 B1 | 9/2003 | McDaniel et al. |
| 6,620,894 B2 | 9/2003 | Sachs |
| 6,632,885 B2 | 10/2003 | Morizono et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,825,280 B1 | 11/2004 | Hayakawa et al. |
| 6,833,045 B1 | 12/2004 | Tokita et al. |
| 6,833,415 B2 | 12/2004 | Kendrick et al. |
| 6,887,943 B2 | 5/2005 | Onoe et al. |
| 6,891,018 B2 | 5/2005 | Murakami et al. |
| 6,897,273 B2 | 5/2005 | Szul et al. |
| 7,019,080 B2 | 3/2006 | Kashihara et al. |
| 7,026,494 B1 | 4/2006 | Yang et al. |
| 7,041,617 B2 | 5/2006 | Jensen et al. |
| 7,064,225 B2 | 6/2006 | Thorn et al. |
| 7,115,694 B2 | 10/2006 | Shimizu et al. |
| 7,119,153 B2 | 10/2006 | Jensen et al. |
| 7,122,604 B2 | 10/2006 | Onoe et al. |
| 7,148,298 B2 | 12/2006 | Jensen et al. |
| 7,199,073 B2 | 4/2007 | Martin et al. |
| 7,226,886 B2 | 6/2007 | Jayaratne et al. |
| 7,259,215 B2 | 8/2007 | Kanamaru et al. |
| 7,294,599 B2 | 11/2007 | Jensen et al. |
| 7,312,283 B2 | 12/2007 | Martin et al. |
| 7,420,097 B2 | 9/2008 | Thorn et al. |
| 7,468,452 B1 | 12/2008 | Martin et al. |
| 7,517,939 B2 | 4/2009 | Yang et al. |
| 7,521,572 B2 | 4/2009 | Jayaratne et al. |
| 7,572,948 B2 | 8/2009 | Martin et al. |
| 7,619,047 B2 | 11/2009 | Yang et al. |
| 7,863,210 B2 | 1/2011 | Murray et al. |
| 7,884,163 B2 | 2/2011 | McDaniel et al. |
| 7,919,639 B2 | 4/2011 | Murray et al. |
| 8,012,900 B2 | 9/2011 | Murray et al. |
| 8,080,681 B2 | 12/2011 | Murray et al. |
| 8,114,946 B2 | 2/2012 | Yang et al. |
| 8,228,487 B2 | 7/2012 | Rijpma et al. |
| 8,609,793 B2 | 12/2013 | Buck et al. |
| 8,629,292 B2 | 1/2014 | Buck et al. |
| 8,637,616 B2 | 1/2014 | Buck et al. |
| 2002/0119890 A1 | 8/2002 | Wenzel |
| 2003/0134991 A1 | 7/2003 | Tanaka et al. |
| 2004/0059070 A1 | 3/2004 | Whitte |
| 2004/0132917 A1 | 7/2004 | Masi et al. |
| 2005/0159300 A1 | 7/2005 | Jensen et al. |
| 2009/0137755 A1* | 5/2009 | Yamada et al. ............... 526/112 |
| 2010/0076167 A1 | 3/2010 | McDaniel et al. |
| 2010/0292425 A1 | 11/2010 | Yang et al. |
| 2010/0317904 A1 | 12/2010 | Small |
| 2010/0331505 A1 | 12/2010 | Masino et al. |
| 2011/0082323 A1 | 4/2011 | Small et al. |
| 2011/0257348 A1 | 10/2011 | Yang et al. |
| 2012/0010375 A1 | 1/2012 | Yang et al. |
| 2012/0088890 A1 | 4/2012 | Buck et al. |
| 2012/0088924 A1 | 4/2012 | Buck et al. |
| 2012/0232229 A1 | 9/2012 | Buck et al. |
| 2014/0057777 A1 | 2/2014 | Buck et al. |
| 2014/0107363 A1 | 4/2014 | Buck et al. |

FOREIGN PATENT DOCUMENTS

| | | |
|---|---|---|
| CN | 1176113 C | 11/2004 |
| DE | 19847320 | 4/2000 |
| EP | 0 752 428 | 1/1997 |
| EP | 0 692 505 | 11/1997 |
| EP | 0 806 436 | 11/1997 |
| EP | 0 849 273 | 6/1998 |
| EP | 2 177 543 | 4/2010 |
| JP | 2002047295 | 2/2002 |
| JP | 2002308893 | 10/2002 |
| JP | 2004175707 | 6/2004 |
| JP | 2004367687 | 11/2009 |
| WO | WO 0246250 A2 | 6/2002 |
| WO | WO 0250127 A2 | 6/2002 |

OTHER PUBLICATIONS

Christopher et al., "Synthesis and Structures of rac-Me$_2$Si($\eta^5$-1-indenyl)$_2$Hf(NMe$_2$)$_2$ and {Me$_2$Si($\eta^5$-1-indenyl)($\eta^3$-2-indenyl)}Hf(NMe$_2$)$_2$," Organometallics, 1997, 16, pp. 3044-3050.

Christopher et al., "Synthesis, Structure, and Reactivity of rac-Me$_2$Si(indenyl)$_2$Zr(NMe$_2$)$_2$," Organometallics, 1996, 15, pp. 4038-4044.

Cotton et al., Advanced Inorganic Chemistry, 6th Ed., Wiley-Interscience, 1999, 4 pages.

DesLauriers et al., "Quantifying short chain branching microstructures in ethylene 1-olefin copolymers using size exclusion chromatography and Fourier transform infrared spectroscopy (SEC-FTIR)," Polymer, 2002, 43, pp. 159-170.

Diamond et al., "Efficient Synthesis of chiral ansa-Metallocenes by Amine Elimination. Synthesis, Structure, and Reactivity of rac-(EBI)Zr(NMe$_2$)$_2$," J. Am. Chem. Soc., 1996, 118, pp. 8024-8033.

Diamond et al., "Efficient Synthesis of rac-(Ethylenebis(indenyl))ZrX$_2$ Complexes via Amine Elimination," Organometallics, 1995, 14, pp. 5-7.

Diamond et al., "Synthesis of Group 4 Metal rac-(EBI)M(NR$_2$)$_2$ Complexes by Amine Elimination. Scope and Limitations," Organometallics, 1996, 15, pp. 4030-4037.

Diamond et al., "Synthesis of Me$_2$Si-Bridged ansa-Zirconocenes by Amine Elimination," Organometallics, 1996, 15, pp. 4045-4053.

Dunn et al., "Computational Modeling of ansa-Zirconocene Amide Complexes," Organometallics, 2004, 23, pp. 5671-5680.

Hawley's Condensed Chemical Dictionary, 11th Ed., John Wiley & Sons, 1995, 3 pages.

Hieber et al., "Shear-Rate-Dependence Modeling of Polymer Melt Viscosity," Polymer Engineering and Science, 1992, 32(14), pp. 931-938.

Hieber et al., "Some correlations involving the shear viscosity of polystyrene melts," Rheologica Acta, 1989, 28, pp. 321-332.

Janzen et al., "Diagnosing long-chain branching in polyethylenes," Journal of Molecular Structure, 1999, 485-486, pp. 569-584.

Jutzi et al., "$\pi$-H$_3$C$_5$(Me$_2$Si)(Me$_2$SiSiMe$_2$)-$\pi$-C$_5$H$_3$: a novel double-bridged dicyclopentadienyl ligand. Synthesis and application in complex chemistry," Journal of Organometallic Chemistry, 1997, 541(1-2), pp. 9-17.

Kim et al., "In situ activation of rac-(SBI)Zr(NMe$_2$)$_2$ for the polymerization of propylene," Polymer Bulletin (Springer-Verlag), 1997, 39, 2 pages.

Köppl et al., "Homopolymerization of ethylene and copolymerization of ethylene and 1-hexene with bridged metallocene/ methylaluminoxane catalysts: the influence of the bridging moiety," Journal of Molecular Catalysis A: Chemical, 2000, 153(1-2), pp. 109-119.

Li et al., "Coordination Copolymerization of Severely Encumbered Isoalkenes with Ethylene: Enhanced Enchainment Mediated by Binuclear Catalysts and Cocatalysts," J. Am. Chem. Soc., 2005, 127, pp. 14756-14768.

LoCoco et al., "Chelate-Controlled Synthesis of rac- and meso-Me$_2$Si(3-$^t$Bu-C$_5$H$_3$)$_2$ZrCl$_2$," Organometallics, 2003, 22, pp. 5498-5503.

(56) References Cited

OTHER PUBLICATIONS

LoCoco et al., "Chelate-Controlled Synthesis of Racemic *ansa*-Zirconocenes," J. Am. Chem. Soc., 2004, 126, pp. 15231-15244.

LoCoco et al., "Enantioselective Synthesis of *ansa*-Zirconocenes," J. Am. Chem. Soc., 2004, 126, pp. 13918-13919.

Pérez-Camacho et al., "$Si_2Me_4$-bridged zirconocene dichlorides: crystal and molecular structure of *meso*-$Si_2Me_4$(3-$SiMe_3$-$C_9H_5)_2ZrCl_2$," Journal of Organometallic Chemistry, 1999, 585, pp. 18-25.

Pinnavaia, "Intercalated Clay Catalysts," Science, 1983, 220(4595), pp. 365-371.

Schertl et al., "ansa-Bis(fluorenyl) complexes of zirconium and hafnium with silicon in the bridge: synthesis and polymerization properties," Journal of Organometallic Chemistry, 1997, 545-546, pp. 553-557.

Thiele et al., "Tetramethyldisilane-1,2-diyl bridged dicyclopentadienyl and diindenyl metal dichlorides of the Group 4 metals—crystal structure of [cyclic] $C_5H_4$—$SiMe_2$-$C_5H_4ZrCl_2$," Z. anorg. Allg. Chem, 1996, 622(10), pp. 1806-1810.

Thiyagarajan et al., "Aluminum *ansa*-Indenyl Compounds. Synthesis, Structures, Dynamic Properties, and Application in the Synthesis of Group 4 *ansa*-Metallocenes," Organometallics, 1999, 18, pp. 5347-5359.

Thomas, "Sheet Silicate Intercalates: New Agents for Unusual Chemical Conversions," Intercalation Chemistry (S. Whittington and A. Jacobson, eds.), Academic Press, Inc. Ch. 3, 1972, pp. 55-99.

Tian et al., "Crystal structures and polymerization catalytic properties of 1,1,2,2-tetramethyldisilanebis(3-t-butyl-η 5-cyclopentadienyl) titanium and zirconium dichlorides," Journal of Organometallic Chemistry, 1999, 579(1-2), pp. 24-29.

Tian et al., "Ethylene polymerization with sila-bridged dinuclear zirconocene catalysts," Macromolecular Chemistry and Physics, 2002, 203(1), pp. 31-36.

Wigum et al., "Structure-property transition-state model for the copolymerization of ethene and 1-hexene with experimental and theoretical applications to novel disilylene-bridged zirconocenes," Polymer Chemistry, 2003, 41(11), pp. 1622-1631.

Wild et al., "*ansa*-Metallocene Derivatives: IV. Synthesis and molecular structures of chiral *ansa*-titanocene derivatives with bridged tetrahydroindenyl ligands,"Journal of Organometallic Chemistry, 1982, 232(3), 3 pages.

Wiley InterScience, Angewandte Chemie International Edition in English, http://www3.interscience.wiley.com/journal/106581873/abstract?CRETRY=1&SRETRY=0, 1979, 18, 2 pages.

Zachmanoglou et al., "Chiral *Ansa* Zirconocene Compounds with [MeSi] and [MeSi] Bridges and with *tert*-Butyl Ring Substituents: Synthesis and Structural Chracterization of the *Racemo* Complexes *rac*-[MeSi(CH-2,4-Bu)]ZrCl and *rac*-[MeSi(CH-2,4-Bu)]ZrCl," Organometallics, 2005, 24(4), pp. 603-611.

Zachmanoglou et al., "The Electronic Influence of Ring Substituents and Ansa Bridges in Zirconocene Complexes as Probed by Infrared Spectroscopic, Electrochemical, and Computational Studies," Journal of the American Chemical Society, 2002, 124(32), pp. 9525-9546.

Zhang et al., "General Synthesis of Racemic $Me_2Si$-Bridged Bis(indenyl) Zirconocene Complexes," J. Am. Chem. Soc., 2000, 122, pp. 8093-8094.

Wang et al., "Ansa-metallocene Complexes (III)—Synthesis and Application in Ethylene Polymerization of Sila-bridged Bis(indenyl and tetrahydroindenyl) Titanium and Zirconium Complexes," Chemical Journal of Chinese Universities, vol. 20 (1), 1999, p. 80.

Wyatt, "Light scattering and the absolute characterization of macromolecules," Wyatt Technology Corporation, Analytica Chimica Acta, 272, 1993, pp. 1-40.

Xiu-Li et al., "ansa-Metallocene Complexes(IV)—Synthesis, Structure and Application in Ethylene Polymerization of Sila-bridged Substituted Cyclopentadienyl Titanium and Zirconium," Chemical Research in Chinese Universities, 2000, 4 pages.

Ying et al., "Synthesis and Structure of 1,1'-(Tetramethyldisilandiyl) η~5-Dicyclopentadienyl Zirconium Dibromide," Chemical Research in Chinese Universities, 1991, 1 page.

Tumay, TA, et al., "Ring-Closing Metathesis of Sterically Congested Functionalized Zirconocenes-ethene Polymerization Catalysts Derived from Related Bridged and Open Metallocenes," *Dalton Transactions*, No. 41, 2009, pp. 8923-8928.

Wang, B., et al., "Ansa-Metallocene Polymerization Catalysts: Effects of the Bridges on the Catalytic Activities," *Coordination Chemistry Reviews*, vol. 250, No. 1-2, Jan. 2006, pp. 242-258.

Cho, YJ, et al., "Molecular Structure of Rac-Cis-1,4-2-Butenylenebis(1-idenyl)zirconium Dichloride," *Bulletin of the Korean Chemical Society*, vol. 20, No. 3, Mar. 20, 1999, pp. 362-364.

Park, JT, et al., "An Efficient Synthetic Method of Ansa-Zirconocene Dimethyl Complexes Via Me2ZrCl2," *Journal of Organometallic Chemistry*, vol. 5325, No. 1-2, May 15, 1997, pp. 29-32.

*Modern Plastics Encyclopedia*, Mid-Nov. 1995 Issue, vol. 72, No. 12, 3 pages.

*Film Extrusion Manual—Process, Materials, Properties*, TAPPI Press, 1992, 13 pages.

International Search Report for PCT/US2011/055070 dated Feb. 2, 2012. 6 pages.

Partial International Search Report for PCT/US2011/055026 dated Jun. 12, 2012. 3 pages.

International Search Report for PCT/US2013/034373 dated Aug. 20, 2013, 3 pages.

U.S. Office Action in U.S. Appl. No. 12/899,735 dated Jan. 29, 2013, 22 pages.

U.S. Office Action in U.S. Appl. No. 13/437,277 dated Mar. 28, 2013, 18 pages.

\* cited by examiner

BRIDGED METALLOCENE CATALYST SYSTEMS WITH SWITCHABLE HYDROGEN AND COMONOMER EFFECTS

REFERENCE TO RELATED APPLICATION

This application is a divisional application of co-pending U.S. patent application Ser. No. 12/899,753, filed on Oct. 7, 2010, now U.S. Pat. No. 8,637,616, the disclosure of which is incorporated herein by reference in its entirety.

BACKGROUND OF THE INVENTION

The present invention relates generally to the field of olefin polymerization catalysis, metallocene catalyst compositions, methods for the polymerization and copolymerization of olefins, and polyolefins.

SUMMARY OF THE INVENTION

Disclosed herein are polymerization processes employing bridged metallocene catalyst systems for the production of olefin polymers. The olefin polymers produced from the disclosed polymerization processes demonstrate unexpected properties based upon the presence or absence of hydrogen and/or comonomer in the polymerization process.

In accordance with an aspect of the present invention, a catalyst composition is provided, and this catalyst composition comprises an ansa-metallocene compound and an activator or an activator-support. In another aspect, an olefin polymerization process is provided and, in this aspect, the process comprises contacting a catalyst composition with an olefin monomer and optionally an olefin comonomer under polymerization conditions to produce an olefin polymer, wherein the catalyst composition comprises an ansa-metallocene compound and an activator or an activator-support.

In these catalyst compositions and polymerization processes, the ansa-metallocene compound has formula (I):

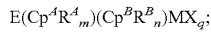

wherein:
M is Ti, Zr, Hf, Cr, Sc, Y, La, or a lanthanide;
$Cp^A$ and $Cp^B$ independently are a cyclopentadienyl, indenyl, or fluorenyl group;
each $R^A$ and $R^B$ independently is H or a hydrocarbyl, hydrocarbylsilyl, hydrocarbylamino, or hydrocarbyloxide group having up to 18 carbon atoms;
E is a bridging chain of 3 to 8 carbon atoms or 2 to 8 silicon, germanium, or tin atoms, wherein any substituents on atoms of the bridging chain independently are H or a hydrocarbyl group having up to 18 carbon atoms;
each X independently is F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;
m is 0, 1, 2, 3, or 4;
n is 0, 1, 2, 3, or 4;
q is 2 when M is Ti, Zr, or Hf; and
q is 1 when M is Cr, Sc, Y, La, or a lanthanide.

Polymers produced from the polymerization of olefins using these bridged metallocene catalyst systems, resulting in homopolymers, copolymers, and the like, can be used to produce various articles of manufacture.

DEFINITIONS

Figure 1:
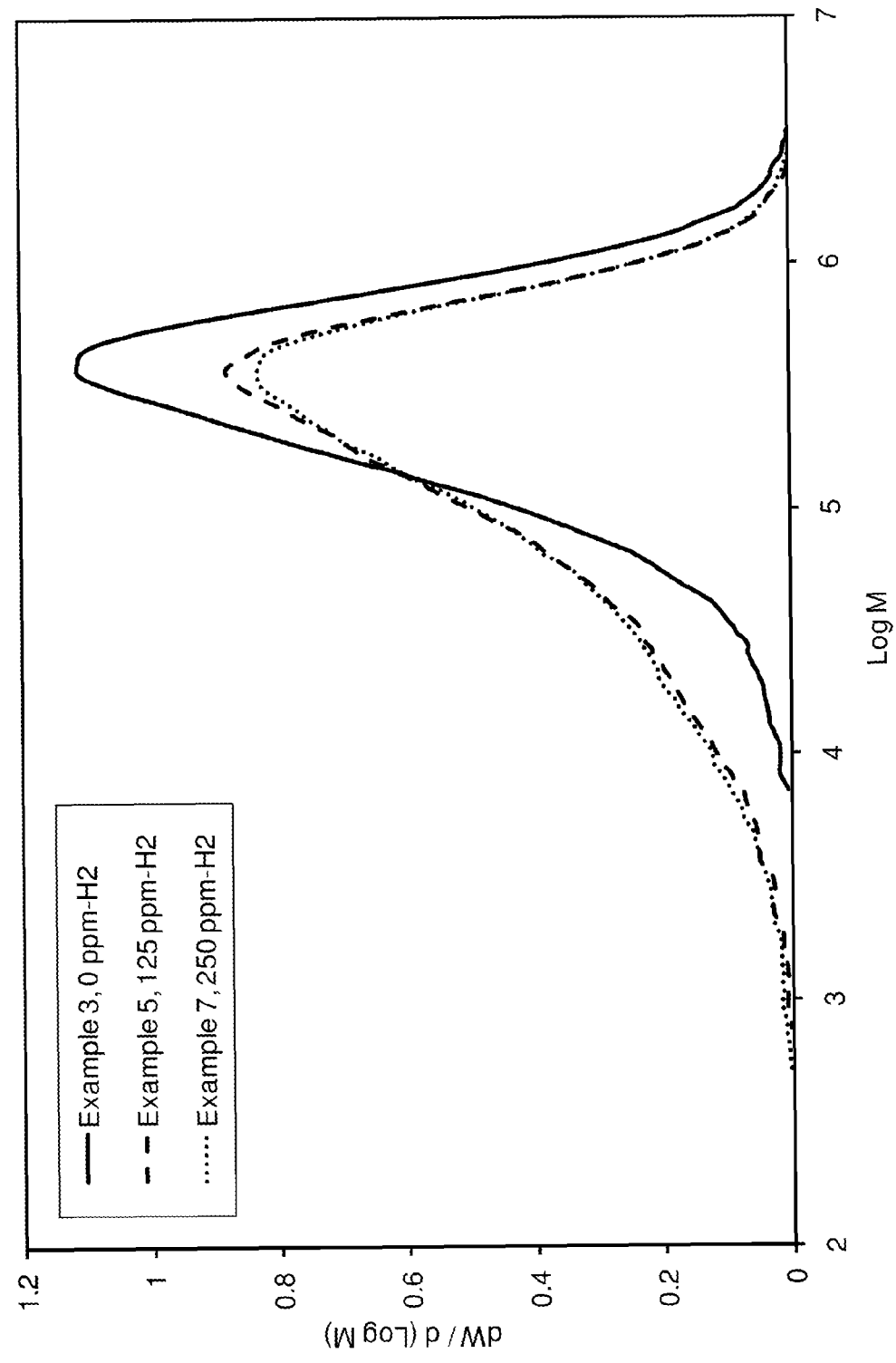
FIG. 1 presents a plot of the molecular weight distributions of the polymers of Examples 3, 5, and 7.

To define more clearly the terms used herein, the following definitions are provided. To the extent that any definition or usage provided by any document incorporated herein by reference conflicts with the definition or usage provided herein, the definition or usage provided herein controls.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

Hydrogen in this disclosure can refer to either hydrogen ($H_2$) which is used in a polymerization process, or a hydrogen atom (H), which can be present, for example, on a metallocene compound. When used to denote a hydrogen atom, hydrogen will be displayed as "H," whereas if the intent is to disclose the use of hydrogen in a polymerization process, it will simply be referred to as "hydrogen."

The term "co-catalyst" is used generally herein to refer to organoaluminum compounds that can constitute one component of a catalyst composition. Additionally, "co-catalyst" can refer to other components of a catalyst composition including, but not limited to, aluminoxanes, organoboron or organoborate compounds, and ionizing ionic compounds, as disclosed herein, when used in addition to an activator-support. The term "co-catalyst" is used regardless of the actual function of the compound or any chemical mechanism by which the compound may operate. In one aspect of this invention, the term "co-catalyst" is used to distinguish that component of the catalyst composition from the metallocene compound(s).

The terms "chemically-treated solid oxide," "activator-support," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The terms "support" and "activator-support" are not used to imply these components are inert, and such components should not be construed as an inert component of the catalyst composition. The activator-support of the present invention can be a chemically-treated solid oxide. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound. Metallocene also is used generically herein to encompass dinuclear metallocene compounds, i.e., compounds comprising two metallocene moieties linked by a connecting group, such as an alkenyl group resulting from an olefin metathesis reaction or a saturated version resulting from hydrogenation or derivatization.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which may be blended, mixed, slurried, dissolved, reacted, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound (one or more than one), olefin monomer (or monomers), and organoaluminum compound (or compounds), before this mixture is contacted with an activator-support(s) and optional additional organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene compound and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Additionally, the precontacted mixture can describe a mixture of metallocene compound(s) and organoaluminum compound(s), prior to contacting this mixture with an activator-support(s). This precontacted mixture also can describe a mixture of metallocene compound(s), olefin monomer(s), and activator-support(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound(s), olefin monomer(s), organoaluminum compound(s), and activator-support(s) formed from contacting the precontacted mixture of a portion of these components with any additional components added to make up the postcontacted mixture. Often, the activator-support comprises a chemically-treated solid oxide. For instance, the additional component added to make up the postcontacted mixture can be a chemically-treated solid oxide (one or more than one), and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of weight ratios, a range of molar ratios, a range of surface areas, a range of pore volumes, a range of catalyst activities, a range of temperatures, a range of times, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language a hydrocarbyl group having up to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the molar ratio of olefin comonomer to olefin monomer provided in one aspect of this invention. By a disclosure that the olefin comonomer:monomer ratio can be in a range from about 0.001:1 to about 0.06:1, Applicants intend to recite that the comonomer:monomer ratio can be about 0.001:1, about 0.002:1, about 0.003:1, about 0.004:1, about 0.005:1, about 0.006:1, about 0.007:1, about 0.008:1, about 0.009:1, about 0.01:1, about 0.015:1, about 0.02:1, about 0.025:1, about 0.03:1, about 0.035:1, about 0.04:1, about 0.045:1, about 0.05:1, about 0.055:1, or about 0.06:1. Additionally, the comonomer:monomer ratio can be within any range from about 0.001:1 to about 0.06:1 (for example, from about 0.01:1 to about 0.05:1), and this also includes any combination of ranges between about 0.001:1 and about 0.06:1 (for example, the comonomer:monomer ratio is in a range from about 0.001:1 to about 0.01:1, or from about 0.04:1 to about 0.06:1). Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The terms "a," "an," "the," etc., are intended to include plural alternatives, e.g., at least one, unless otherwise specified. For instance, the disclosure of "an activator-support" or "an ansa-metallocene compound" is meant to encompass one, or mixtures or combinations of more than one, activator-support or ansa-metallocene compound, respectively.

While compositions and methods are described in terms of "comprising" various components or steps, the compositions and methods can also "consist essentially of" or "consist of" the various components or steps. For example, a catalyst composition of the present invention can comprise; alternatively, can consist essentially of; or alternatively, can consist of; (i) an ansa-metallocene compound and (ii) an activator.

DETAILED DESCRIPTION OF THE INVENTION

The present invention is directed generally to catalyst compositions, methods for preparing catalyst compositions, methods for using the catalyst compositions to polymerize olefins, the polymer resins produced using such catalyst compositions, and articles produced using these polymer resins. In one aspect, the present invention relates to a catalyst composition, said catalyst composition comprising (or consisting essentially of, or consisting of) an ansa-metallocene compound and an activator-support.

In another aspect, an olefin polymerization process is provided and, in this aspect, the process comprises (or consists essentially of, or consists of) contacting a catalyst composition with an olefin monomer and optionally an olefin comonomer under polymerization conditions to produce an olefin polymer, wherein the catalyst composition comprises (or consists essentially of, or consists of) an ansa-metallocene compound and an activator.

Olefin homopolymers, copolymers, terpolymers, and the like, can be produced using the catalyst compositions and methods for olefin polymerization disclosed herein.

Ansa-Metallocene Compound

A catalyst composition of the present invention can comprise an activator or activator-support and an ansa-metallocene compound having formula (I). Formula (I) is:

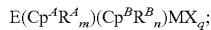

wherein:

M is Ti, Zr, Hf, Cr, Sc, Y, La, or a lanthanide;

$Cp^A$ and $Cp^B$ independently are a cyclopentadienyl, indenyl, or fluorenyl group;

each $R^A$ and $R^B$ independently is H or a hydrocarbyl, hydrocarbylsilyl, hydrocarbylamino, or hydrocarbyloxide group having up to 18 carbon atoms;

E is a bridging chain of 3 to 8 carbon atoms or 2 to 8 silicon, germanium, or tin atoms, wherein any substituents on atoms of the bridging chain independently are H or a hydrocarbyl group having up to 18 carbon atoms;

each X independently is F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

m is 0, 1, 2, 3, or 4;

n is 0, 1, 2, 3, or 4;

q is 2 when M is Ti, Zr, or Hf; and q is 1 when M is Cr, Sc, Y, La, or a lanthanide.

Unless otherwise specified, formula (I) above, any other structural formulas disclosed herein, and any metallocene species or compound disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

Hydrocarbyl is used herein to specify a hydrocarbon radical group that includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, linear, and/or branched derivatives thereof. Unless otherwise specified, the hydrocarbyl groups of this invention typically comprise up to about 18 carbon atoms. In another aspect, hydrocarbyl groups can have up to 12 carbon atoms, for instance, up to 10 carbon atoms, up to 8 carbon atoms, or up to 6 carbon atoms. A hydrocarbyloxide group, therefore, is used generically to include alkoxide, aryloxide, and -(alkyl or aryl)-O-(alkyl or aryl) groups, and these groups can comprise up to about 18 carbon atoms. Illustrative and non-limiting examples of alkoxide and aryloxide groups (i.e., hydrocarbyloxide groups) include methoxy, ethoxy, propoxy, butoxy, phenoxy, substituted phenoxy, and the like. The term hydrocarbylamino group is used generically to refer collectively to alkylamino, arylamino, dialkylamino, diarylamino, and -(alkyl or aryl)-N-(alkyl or aryl) groups, and the like. Unless otherwise specified, the hydrocarbylamino groups of this invention comprise up to about 18 carbon atoms. Hydrocarbylsilyl groups include, but are not limited to, alkylsilyl groups, alkenylsilyl groups, arylsilyl groups, arylalkylsilyl groups, and the like, which have up to about 18 carbon atoms. For example, illustrative hydrocarbylsilyl groups can include trimethylsilyl and phenyloctylsilyl. These hydrocarbyloxide, hydrocarbylamino, and hydrocarbylsilyl groups can have up to 12 carbon atoms; alternatively, up to 10 carbon atoms; or alternatively, up to 8 carbon atoms, in other aspects of the present invention.

Unless otherwise specified, alkyl groups and alkenyl groups described herein are intended to include all structural isomers, linear or branched, of a given moiety; for example, all enantiomers and all diastereomers are included within this definition. As an example, unless otherwise specified, the term propyl is meant to include n-propyl and iso-propyl, while the term butyl is meant to include n-butyl, iso-butyl, t-butyl, sec-butyl, and so forth. For instance, non-limiting examples of octyl isomers include 2-ethyl hexyl and neooctyl. Suitable examples of alkyl groups which can be employed in the present invention include, but are not limited to, methyl, ethyl, propyl, butyl, pentyl, hexyl, heptyl, octyl, nonyl, decyl, and the like. Illustrative examples of alkenyl groups within the scope of the present invention include, but are not limited to, ethenyl, propenyl, butenyl, pentenyl, hexenyl, heptenyl, octenyl, nonenyl, decenyl, and the like. The alkenyl group can be a terminal alkenyl group, but this is not a requirement. For instance, specific alkenyl group substituents can include, but are not limited to, 3-butenyl, 4-pentenyl, 5-hexenyl, 6-heptenyl, 7-octenyl, 3-methyl-3-butenyl, 4-methyl-3-pentenyl, 1,1-dimethyl-3-butenyl, 1,1-dimethyl-4-pentenyl, and the like.

In this disclosure, aryl is meant to include aryl and aralkyl groups, and these include, but are not limited to, phenyl, alkyl-substituted phenyl, naphthyl, alkyl-substituted naphthyl, phenyl-substituted alkyl, naphthyl-substituted alkyl, and the like. Hence, non-limiting examples of such "aryl" moieties that can be used in the present invention include phenyl, tolyl, benzyl, dimethylphenyl, trimethylphenyl, phenylethyl, phenylpropyl, phenylbutyl, propyl-2-phenylethyl, and the like. Unless otherwise specified, any substituted aryl moiety used herein is meant to include all regioisomers; for example, the term tolyl is meant to include any possible substituent position, that is, ortho, meta, or para.

In formula (I), M is Ti, Zr, Hf, Cr, Sc, Y, La, or a lanthanide. In one aspect of this invention, M is Ti, Zr, Hf, or Cr. In another aspect, M is Sc, Y, or La. In still another aspect, M is a lanthanide. Yet, in some aspects disclosed herein, M is Ti, Zr, Hf, Cr, or a lanthanide; alternatively, M is Ti or Cr; alternatively, M is Ti, Zr, or Hf; alternatively, M is Ti; alternatively, M is Zr; or alternatively, M is Hf.

When M is Ti, Zr, or Hf, q is 2. However, when M is Cr, Sc, Y, La, or a lanthanide, q is 1.

$Cp^A$ and $Cp^B$ in formula (I) independently can be a cyclopentadienyl, indenyl, or fluorenyl group. In one aspect of this invention, at least one of $Cp^A$ and $Cp^B$ is a cyclopentadienyl group. In another aspect, at least one of $Cp^A$ and $Cp^B$ is an indenyl group. In yet another aspect, at least one of $Cp^A$ and $Cp^B$ is a fluorenyl group. In still another aspect, $Cp^A$ and $Cp^B$ independently are a cyclopentadienyl or indenyl group. For instance, $Cp^A$ can be a cyclopentadienyl group and $Cp^B$ can be an indenyl group, or both $Cp^A$ and $Cp^B$ can be an indenyl group.

In formula (I), each $R^A$ and $R^B$ independently can be H or a hydrocarbyl, hydrocarbylsilyl, hydrocarbylamino, or hydrocarbyloxide group having up to 18 carbon atoms or, alternatively, up to 12 carbon atoms. In some aspects, each $R^A$ and $R^B$ independently can be H or an alkyl group, an alkenyl group (e.g., a terminal alkenyl group), or an aryl group having up to 12 carbon atoms; alternatively, having up to 10 carbon atoms; or alternatively, having up to 8 carbon atoms. Accordingly, each $R^A$ and $R^B$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl.

Each $R^A$ and $R^B$ substituent, independently, can be different. For example, $Cp^A$ can have both a methyl substituent and a propenyl substituent. As another example, $Cp^B$ can have two t-butyl substituents. Hence, a $Cp^A R^A_2$ group can be an indenyl group with a both a methyl substituent and a propenyl substituent, while a $Cp^B R^B_2$ group can be a fluorenyl group with two t-butyl substituents.

In formula (I), m can be 0, 1, 2, 3, or 4, while independently n can be 0, 1, 2, 3, or 4. The integers m and n reflect the total number of substituents on $Cp^A$ and $Cp^B$, respectively (excluding bridging group E, to be discussed further below), irrespective of whether the substituents are the same or different. When m is equal to 0, $Cp^A$ can be, for example, an unsubstituted cyclopentadienyl group or an unsubstituted indenyl group, i.e., no substitutions other than bridging group E.

Each X independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms. It is contemplated that each X independently can be F, Cl, Br, I, benzyl, phenyl, or methyl. For example, each X independently can be Cl, benzyl, phenyl, or methyl in one aspect of this invention. In another aspect, each X independently can be benzyl, phenyl, or methyl. Yet, in another aspect, each X can be Cl; alternatively, each X can be benzyl; alternatively, each X can be phenyl; or alternatively, each X can be methyl.

Bridging group E can be a bridging chain of 3 to 8 carbon atoms or 2 to 8 silicon, germanium, or tin atoms. For example, E can be a bridging chain of 3 to 8 carbon atoms, of 3 to 6 carbon atoms, of 3 to 4 carbons atoms, of 3 carbon atoms, or of 4 carbons atoms. Alternatively, E can be a bridging chain of 2 to 8 silicon, germanium, or tin atoms, of 2 to 6 silicon, germanium, or tin atoms, of 2 to 4 silicon, germanium, or tin atoms, of 2 to 4 silicon atoms, of 2 silicon atoms, of 3 silicon atoms, or of 4 silicon atoms.

Any substituents on atoms of the bridging chain independently are H or a hydrocarbyl group having up to 18 carbon atoms or, alternatively, having up to 12 carbon atoms. Suitable substituents can include, but are not limited to, H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl. In one aspect, the substituents independently can be H, methyl, ethyl, propyl, butyl, pentyl, hexyl, allyl, butenyl, pentenyl, hexenyl, phenyl, or benzyl. In another aspect, the substituents independently can be methyl, ethyl, propyl, butyl, allyl, butenyl, pentenyl, or phenyl.

In accordance with one aspect of this invention, E is a bridging chain having the formula $-(CR^{10A}R^{10B})_u-$, wherein u is an integer from 3 to 8 (e.g., u is 3, 4, 5, or 6), and $R^{10A}$ and $R^{10B}$ are independently H or a hydrocarbyl group having up to 18 carbon atoms; alternatively, up to 12 carbon atoms; or alternatively, up to 8 carbon atoms. It is contemplated that $R^{10A}$ and $R^{10B}$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; alternatively, H, methyl, ethyl, propyl, butyl, allyl, butenyl, pentenyl, phenyl, or benzyl; or alternatively, H, methyl, ethyl, propyl, or butyl. In some aspects, u is 3, 4, 5, or 6, and $R^{10A}$ and $R^{10B}$ both are H, or methyl, or ethyl, or propyl, or butyl, or allyl, or butenyl, or pentenyl, or phenyl, or benzyl.

In accordance with another aspect of this invention, E is a bridging chain having the formula $-(SiR^{11A}R^{11B})_v-$, wherein v is an integer from 2 to 8 (e.g., v is 2, 3, 4, 5, or 6), and $R^{11A}$ and $R^{11B}$ are independently H or a hydrocarbyl group having up to 18 carbon atoms; alternatively, up to 12 carbon atoms; or alternatively, up to 8 carbon atoms. It is contemplated that $R^{11A}$ and $R^{11B}$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; alternatively, H, methyl, ethyl, propyl, butyl, allyl, butenyl, pentenyl, phenyl, or benzyl; or alternatively, H, methyl, ethyl, propyl, or butyl. In some aspects, v is 2, 3, 4, 5, or 6 (e.g., v is 2), and $R^{11A}$ and $R^{11B}$ both are H, or methyl, or ethyl, or propyl, or butyl, or allyl, or butenyl, or pentenyl, or phenyl, or benzyl.

It is contemplated in aspects of the invention that M in formula (I) can be Ti, Zr, or Hf; q can be 2; each $R^A$ and $R^B$ independently can be H or a hydrocarbyl group having up to 12 carbon atoms; and E can be a bridging chain of 3 to 6 carbon atoms or 2 to 4 silicon atoms, wherein any substituents on atoms of the bridging chain independently can be H or a hydrocarbyl group having up to 12 carbon atoms. Additionally, each X in formula (I) independently can be F, Cl, Br, I, methyl, benzyl, or phenyl; m can be 0, 1, or 2; and n can be 0, 1, or 2.

In a further aspect, M can be Zr or Hf; each $R^A$ and $R^B$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; E can be a bridging chain of 3 to 4 carbon atoms or 2 to 3 silicon atoms, wherein any substituents on atoms of the bridging chain independently can be H or methyl; m can be 0 or 1; and n can be 0 or 1. Even further, $Cp^A$ and $Cp^B$ independently can be a cyclopentadienyl group or an indenyl group, E can be $-SiMe_2-SiMe_2-$, and each X can be Cl, in other aspects of this invention.

Non-limiting examples of ansa-metallocene compounds having formula (I) that are suitable for use in catalyst compositions and polymerization processes disclosed herein, either singularly or in combination, include, but are not limited to, the following compounds:

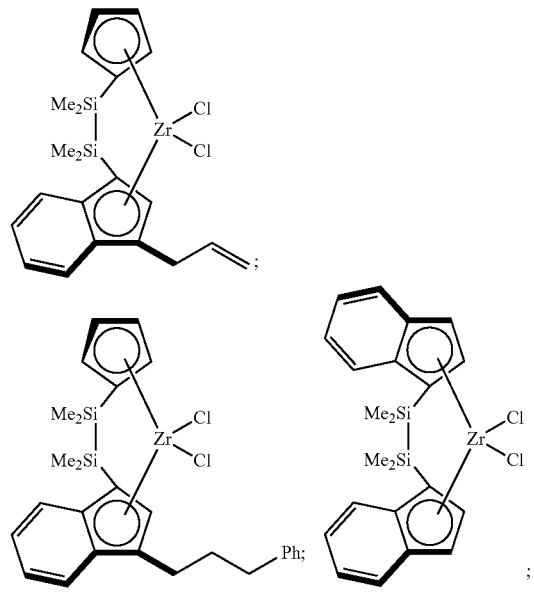

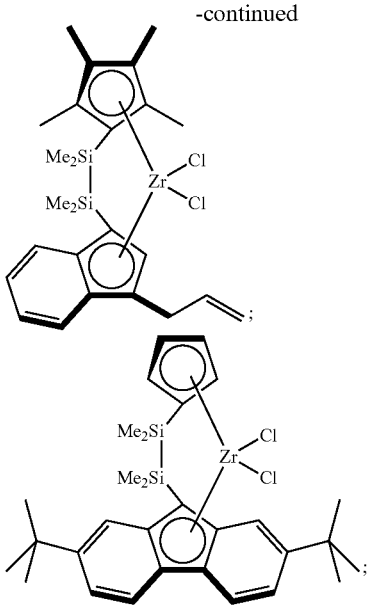

and the like, including combinations thereof.

In accordance with another aspect of this invention, the ansa-metallocene compound having formula (I) can comprise (or consist essentially of, or consist of) an ansa-metallocene compound having formula (II), or formula (III), or formula (IV), or formula (V), or formula (VI), or formula (VII), or combinations thereof:

formula (II)
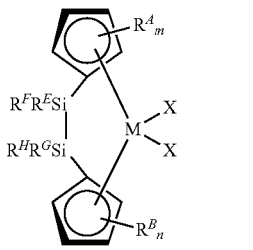

formula (III)
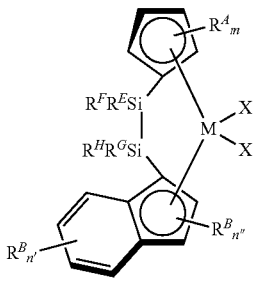

formula (IV)
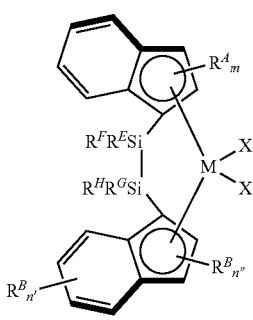

formula (V)
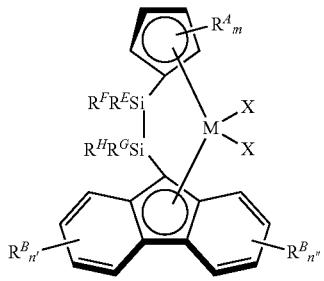

formula (VI)
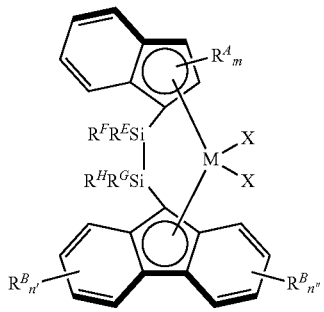

formula (VII)
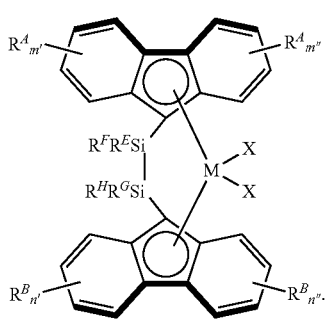

In formulas (II), (III), (IV), (V), (VI), and (VII), X, $R^A$, $R^B$, m, and n are as described above for formula (I). In some aspects, for example, each X in formulas (II), (III), (IV), (V), (VI), and (VII) independently can be F, Cl, Br, I, methyl, benzyl, or phenyl, while each $R^A$ and $R^B$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl.

M can be Ti, Zr, or Hf in formulas (II), (III), (IV), (V), (VI), and (VII), while m'+m"=m and n'+n"=n. The substituents on atoms of the silicon bridging chain, $R^E$, $R^F$, $R^G$, and $R^H$, independently can be H or a hydrocarbyl group having up to 18 carbon atoms or, alternatively, having up to 12 carbon atoms. Accordingly, $R^E$, $R^F$, $R^G$, and $R^H$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; alternatively, $R^E$, $R^F$, $R^G$, and $R^H$ independently can be H, methyl, ethyl, propyl, butyl, pentyl, hexyl, allyl, butenyl, pentenyl, hexenyl, phenyl, or benzyl; alternatively, $R^E$, $R^F$, $R^G$, and $R^H$ independently can be methyl, ethyl, propyl, butyl, allyl, butenyl, pentenyl, or phenyl; alternatively, $R^E$, $R^F$, $R^G$, and $R^H$ can be H; alternatively, $R^E$, $R^F$, $R^G$, and $R^H$ can be methyl; alternatively, $R^E$, $R^F$, $R^G$, and $R^H$ can be ethyl; alternatively, $R^E$, $R^F$, $R^G$, and $R^H$ can be propyl; alternatively, $R^E$, $R^F$, $R^G$, and $R^H$ can be butyl; alternatively, $R^E$, $R^F$, $R^G$, and $R^H$ can be allyl; alternatively, $R^E$, $R^F$, $R^G$, and $R^H$ can be butenyl; alternatively, $R^E$, $R^F$, $R^G$, and $R^H$ can be pentenyl; or alternatively, $R^E$, $R^F$, $R^G$, and $R^H$ can be phenyl.

In accordance with another aspect of this invention, the ansa-metallocene compound having formula (I) can comprise (or consist essentially of, or consist of) an ansa-metallocene compound having formula (C), formula (D), formula (E), or combinations thereof.

Formula (C) is

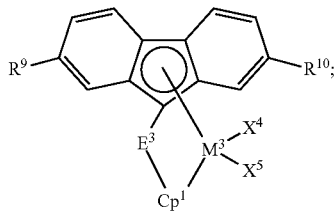

wherein:

$M^3$ is Zr or Hf;

$X^4$ and $X^5$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^3$ is a bridging group having the formula —$SiR^{7D}R^{8D}$—$SiR^{7E}R^{8E}$—, wherein $R^{7D}$, $R^{8D}$, $R^{7E}$, and $R^{8E}$ are independently H or a hydrocarbyl group having up to 10 carbon atoms;

$R^9$ and $R^{10}$ are independently H or a hydrocarbyl group having up to 18 carbon atoms; and $Cp^1$ is a cyclopentadienyl or indenyl group, any substituent on $Cp^1$ is H or a hydrocarbyl or hydrocarbylsilyl group having up to 18 carbon atoms.

In formula (C), $M^3$ can be Zr or Hf, while $X^4$ and $X^5$ independently can be F; Cl; Br; I; methyl; benzyl; phenyl; H; $BH_4$; $OBR_2$ or $SO_3R$, wherein R can be an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^4$ and $X^5$ independently can be F, Cl, Br, I, benzyl, phenyl, or methyl. For example, $X^4$ and $X^5$ independently are Cl, benzyl, phenyl, or methyl in one aspect of this invention. In another aspect, $X^4$ and $X^5$ independently are benzyl, phenyl, or methyl. Yet, in another aspect, both $X^4$ and $X^5$ can be Cl; alternatively, both $X^4$ and $X^5$ can be benzyl; alternatively, both $X^4$ and $X^5$ can be phenyl; or alternatively, both $X^4$ and $X^5$ can be methyl.

In formula (C), $E^3$ can be a bridging group having the formula —$SiR^{7D}R^{8D}$—$SiR^{7E}R^{8E}$—, wherein $R^{7D}$, $R^{8D}$, $R^{7E}$, and $R^{8E}$ are independently H or a hydrocarbyl group having up to 10 carbon atoms or, alternatively, up to 6 carbon atoms. Accordingly, in aspects of this invention, $R^{7D}$, $R^{8D}$, $R^{7E}$, and $R^{8E}$ independently can be H or an alkyl or an alkenyl group having up to 6 carbon atoms; alternatively, $R^{7D}$, $R^{8D}$, $R^{7E}$, and $R^{8E}$ independently can be H, methyl, ethyl, propyl, butyl, allyl, butenyl, or pentenyl; alternatively, $R^{7D}$, $R^{8D}$, $R^{7E}$, and $R^{8E}$ independently can be H, methyl, or ethyl; alternatively, $R^{7D}$, $R^{8D}$, $R^{7E}$, and $R^{8E}$ can be H; or alternatively, $R^{7D}$, $R^{8D}$, $R^{7E}$, and $R^{8E}$ can be methyl.

$R^9$ and $R^{10}$ on the fluorenyl group in formula (C) independently can be H or a hydrocarbyl group having up to 18 carbon atoms or, alternatively, having up to 12 carbon atoms. Accordingly, $R^9$ and $R^{10}$ independently can be H or a hydrocarbyl group having up to 8 carbon atoms, such as, for example, alkyl groups: methyl, ethyl, propyl, butyl, pentyl, or hexyl, and the like. In some aspects, $R^9$ and $R^{10}$ are independently methyl, ethyl, propyl, n-butyl, t-butyl, or hexyl, while in other aspects, $R^9$ and $R^{10}$ are independently H or t-butyl. For example, both $R^9$ and $R^{10}$ can be H or, alternatively, both $R^9$ and $R^{10}$ can be t-butyl.

In formula (C), $Cp^1$ is a cyclopentadienyl or indenyl group. Often, $Cp^1$ is a cyclopentadienyl group. Any substituent on $Cp^1$ can be H or a hydrocarbyl or hydrocarbylsilyl group having up to 18 carbon atoms; or alternatively, any substituent can be H or a hydrocarbyl or hydrocarbylsilyl group having up to 12 carbon atoms. Possible substituents on $Cp^1$ may include H, therefore this invention comprises partially saturated ligands such as tetrahydroindenyl, partially saturated indenyl, and the like.

In one aspect, $Cp^1$ has no additional substitutions other than those shown in formula (C), e.g., no substituents other than the bridging group $E^3$. In another aspect, $Cp^1$ can have one or two substituents, and each substituent independently is H or an alkyl, alkenyl, alkylsilyl, or alkenylsilyl group having up to 8 carbon atoms, or alternatively, up to 6 carbon atoms. Yet, in another aspect, $Cp^1$ can have a single H, methyl ethyl, propyl, butyl, pentyl, hexyl, heptyl, octyl, ethenyl, propenyl, butenyl, pentenyl, hexenyl, heptenyl, or octenyl substituent.

In accordance with one aspect of this invention, $X^4$ and $X^5$ independently can be F, Cl, Br, I, benzyl, phenyl, or methyl, while $R^9$ and $R^{10}$ independently can be H or t-butyl, and $Cp^1$ either has no additional substituents or $Cp^1$ can have a single substituent selected from H or an alkyl, alkenyl, alkylsilyl, or alkenylsilyl group having up to 8 carbon atoms. In these and other aspects, $E^3$ can be a bridging group having the formula —$SiR^{7D}R^{8D}$—$SiR^{7E}R^{8E}$—, wherein $R^{7D}$, $R^{8D}$, $R^{7E}$, and $R^{8E}$ are independently H or methyl.

Formula (D) is

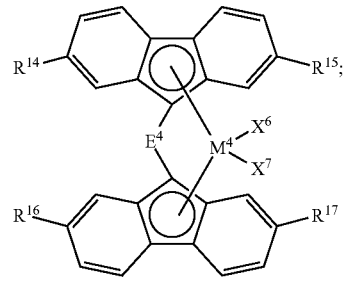

wherein:

$M^4$ is Zr or Hf;

$X^6$ and $X^7$ are independently F; Cl; Br; I; methyl; benzyl; phenyl; H; $BH_4$;

$OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^4$ is a bridging group having the formula —$SiR^{12D}R^{13D}$—$SiR^{12E}R^{13E}$—, wherein $R^{12D}$, $R^{13D}$, $R^{12E}$, and $R^{13E}$ are independently H or a hydrocarbyl group having up to 10 carbon atoms; and $R^{14}$, $R^{15}$, $R^{16}$, and $R^{17}$ are independently H or a hydrocarbyl group having up to 18 carbon atoms.

In formula (D), $M^4$ can be Zr or Hf, while $X^6$ and $X^7$ independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^6$ and $X^7$ independently can be F, Cl, Br, I, benzyl, phenyl, or methyl. For example, $X^6$ and $X^7$ independently are Cl, benzyl, phenyl, or methyl in one aspect of this invention. In another aspect, $X^6$ and $X^7$ independently are benzyl, phenyl, or methyl. Yet, in another aspect, both $X^6$ and $X^7$ can be Cl; alternatively, both $X^6$ and $X^7$ can be benzyl; alternatively, both $X^6$ and $X^7$ can be phenyl; or alternatively, both $X^6$ and $X^7$ can be methyl.

In formula (D), $E^4$ can be a bridging group having the formula $—SiR^{12D}R^{13D}—SiR^{12E}R^{13E}—$, wherein $R^{12D}$, $R^{13D}$, $R^{12E}$, and $R^{13E}$ independently can be H or a hydrocarbyl group having up to 10 carbon atoms or, alternatively, up to 6 carbon atoms. Accordingly, in aspects of this invention, $R^{12D}$, $R^{13D}$, $R^{12E}$, and $R^{13E}$ independently can be H or an alkyl or an alkenyl group having up to 6 carbon atoms; alternatively, $R^{12D}$, $R^{13D}$, $R^{12E}$, and $R^{13E}$ independently can be H, methyl, ethyl, propyl, butyl, allyl, butenyl, or pentenyl; alternatively, $R^{12D}$, $R^{13D}$, $R^{12E}$, and $R^{13E}$ independently can be H, methyl, ethyl, propyl, or butyl; alternatively, $R^{12D}$, $R^{13D}$, $R^{12E}$, and $R^{13E}$ independently can be H, methyl, or ethyl; alternatively, $R^{12D}$, $R^{13D}$, $R^{12E}$, and $R^{13E}$ can be H; or alternatively, $R^{12D}$, $R^{13D}$, $R^{12E}$, and $R^{13E}$ can be methyl.

$R^{14}$, $R^{15}$, $R^{16}$, and $R^{17}$ on the fluorenyl groups in formula (D) independently can be H or a hydrocarbyl group having up to 18 carbon atoms or, alternatively, having up to 12 carbon atoms. Accordingly, $R^{14}$, $R^{15}$, $R^{16}$, and $R^{17}$ independently can be H or a hydrocarbyl group having up to 8 carbon atoms, such as, for example, alkyl groups: methyl, ethyl, propyl, butyl, pentyl, or hexyl, and the like. In some aspects, $R^{14}$, $R^{15}$, $R^{16}$, and $R^{17}$ are independently methyl, ethyl, propyl, n-butyl, t-butyl, or hexyl, while in other aspects, $R^{14}$, $R^{15}$, $R^{16}$, and $R^{17}$ are independently H or t-butyl. For example, $R^{14}$, $R^{15}$, $R^{16}$, and $R^{17}$ can be H or, alternatively, $R^{14}$, $R^{15}$, $R^{16}$, and $R^{17}$ can be t-butyl.

It is contemplated that $X^6$ and $X^7$ independently can be F, Cl, Br, I, benzyl, phenyl, or methyl in formula (D), and $R^{14}$, $R^{15}$, $R^{16}$, and $R^{17}$ independently can be H or t-butyl. In these and other aspects, $E^4$ can be a bridging group having the formula $—SiR^{12D}R^{13D}—SiR^{12E}R^{13E}—$, wherein $R^{12D}$, $R^{13D}$, $R^{12E}$, and $R^{13E}$ are independently H or methyl. Formula (E) is

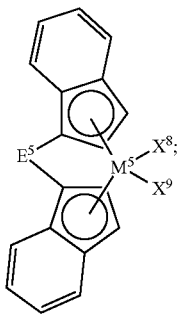

wherein:
$M^5$ is Zr or Hf;
$X^8$ and $X^9$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms; and
$E^5$ is a bridging group selected from:
 a bridging group having the formula $—(CH_2)_w—$, wherein w is an integer from 3 to 8, inclusive, or
 a bridging group having the formula $—SiR^{20B}R^{21B}—SiR^{20C}R^{21C}—$, wherein $R^{20B}$, $R^{21B}$, $R^{20C}$, and $R^{21C}$ are independently H or a hydrocarbyl group having up to 10 carbon atoms.

In formula (E), $M^5$ can be Zr or Hf, while $X^8$ and $X^9$ independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^8$ and $X^9$ independently can be F, Cl, Br, I, benzyl, phenyl, or methyl. For example, $X^8$ and $X^9$ independently are Cl, benzyl, phenyl, or methyl in one aspect of this invention. In another aspect, $X^8$ and $X^9$ independently are benzyl, phenyl, or methyl. Yet, in another aspect, both $X^8$ and $X^9$ can be Cl; alternatively, both $X^8$ and $X^9$ can be benzyl; alternatively, both $X^8$ and $X^9$ can be phenyl; or alternatively, both $X^8$ and $X^9$ can be methyl.

In formula (E), $E^5$ is a bridging group. In accordance with an aspect of this invention, $E^5$ can be a bridging group having the formula $—(CH_2)_w—$, wherein w is an integer from 3 to 8, inclusive. The integer w can be 3, 4, 5, or 6 in some aspects of this invention. In accordance with another aspect of this invention, $E^5$ can be a bridging group having the formula $—SiR^{20B}R^{21B}—SiR^{20C}R^{21C}—$, wherein $R^{20B}$, $R^{21B}$, $R^{20C}$, and $R^{21C}$ independently can be H or a hydrocarbyl group having up to 10 carbon atoms or, alternatively, up to 6 carbon atoms. Accordingly, in aspects of this invention, $R^{2B}$, $R^{21B}$, $R^{20C}$, and $R^{21C}$ independently can be H or an alkyl or an alkenyl group having up to 6 carbon atoms; alternatively, $R^{20B}$, $R^{21B}$, $R^{20C}$, and $R^{21C}$ independently can be H, methyl, ethyl, propyl, butyl, allyl, butenyl, or pentenyl; alternatively, $R^{20B}$, $R^{21B}$, $R^{20C}$, and $R^{21C}$ independently can be H, methyl, ethyl, propyl, or butyl; alternatively, $R^{2B}$, $R^{21B}$, $R^{20C}$, and $R^{21C}$ independently can be H, methyl, or ethyl; alternatively, $R^{20B}$, $R^{21B}$, $R^{20C}$, and $R^{21C}$ can be H; or alternatively, $R^{20B}$, $R^{21B}$, $R^{20C}$, and $R^{21C}$ can be methyl.

In an aspect of this invention, $X^8$ and $X^9$ in formula (E) independently can be F, Cl, Br, I, benzyl, phenyl, or methyl, and in some aspects, $E^5$ can be a bridging group having the formula $—(CH_2)_w—$, wherein w is equal to 3, 4, or 5, or alternatively, $E^5$ can be a bridging group having the formula $—SiR^{20B}R^{21B}—SiR^{20C}R^{21C}—$, wherein $R^{20B}$, $R^{21B}$, $R^{20C}$, and $R^{21C}$ are independently H or methyl.

Non-limiting examples of ansa-metallocene compounds having formula (E) that are suitable for use herein include, but are not limited to, the following:

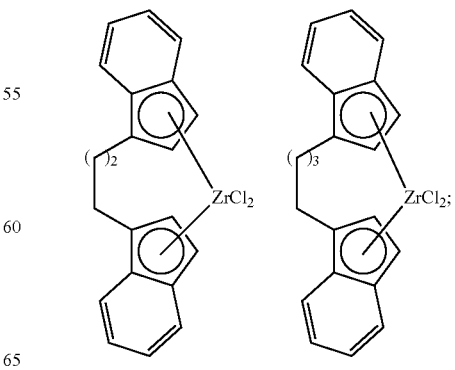

and the like, or combinations thereof.

As noted above, unless otherwise specified, formulas (C), (D), and (E), or any other structural formulas disclosed herein, and any metallocene species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

Activator-Support

The present invention encompasses various catalyst compositions containing an activator, which can be an activator-support. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this invention are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present invention, the solid oxide used to prepare the chemically-treated solid oxide has a pore volume greater than about 0.1 cc/g. According to another aspect of the present invention, the solid oxide has a pore volume greater than about 0.5 cc/g. According to yet another aspect of the present invention, the solid oxide has a pore volume greater than about 1.0 cc/g.

In another aspect, the solid oxide has a surface area of from about 100 to about 1000 m$^2$/g. In yet another aspect, the solid oxide has a surface area of from about 200 to about 800 m$^2$/g. In still another aspect of the present invention, the solid oxide has a surface area of from about 250 to about 600 m$^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this invention also encompasses oxide materials such as silica-coated alumina, as described in U.S. Patent Publication No. 2010-0076167, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present invention. It is contemplated that the electron-withdrawing anion can be, or can comprise, fluoride, chloride, bromide, phosphate, triflate, bisulfate, or sulfate, and the like, or any combination thereof, in some aspects of this invention. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions of the present invention can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present invention, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present invention. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present invention, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present invention, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4$) also can be employed. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this invention, the amount of fluoride or chloride ion present before calcining the solid oxide is from about 1 to about 25% by weight, and according to another aspect of this invention, from about 2 to about 20% by weight. According to yet another aspect of this invention, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present invention, the pore volume is greater than about 0.8 cc/g, and according to another aspect of the present invention, greater than about 1.0 cc/g. Further, the silica-alumina generally has a surface area greater than about 100 m$^2$/g. According to another aspect of this invention, the surface area is greater than about 250 m$^2$/g. Yet, in another aspect, the surface area is greater than about 350 m$^2$/g.

The silica-alumina utilized in the present invention typically has an alumina content from about 5 to about 95% by weight. According to one aspect of this invention, the alumina content of the silica-alumina is from about 5 to about 50%, or from about 8% to about 30%, alumina by weight. In another aspect, high alumina content silica-alumina compounds can be employed, in which the alumina content of these silica-alumina compounds typically ranges from about 60% to about 90%, or from about 65% to about 80%, alumina by weight. According to yet another aspect of this invention, the solid oxide component comprises alumina without silica, and according to another aspect of this invention, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present invention, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 to about 100 parts by weight sulfate ion to about 100 parts by weight solid oxide. According to another aspect of this invention, the amount of sulfate ion present before calcining is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention comprises an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof.

In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the metallocene compounds can be precontacted with an olefin monomer and an organoaluminum compound for a first period of time prior to contacting this mixture with the activator-support. Once the precontacted mixture of the metallocene compound(s), olefin monomer, and organoaluminum compound is contacted with the activator-support, the composition further comprising the activator-support is termed a "postcontacted" mixture. The postcontacted mixture can be allowed to remain in further contact for a second period of time prior to being charged into the reactor in which the polymerization process will be carried out.

According to yet another aspect of the present invention, one or more of the metallocene compounds can be precontacted with an olefin monomer and an activator-support for a first period of time prior to contacting this mixture with the organoaluminum compound. Once the precontacted mixture of the metallocene compound(s), olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor.

Organoaluminum Compounds

In some aspects, catalyst compositions of the present invention can comprise one or more organoaluminum compounds. Such compounds can include, but are not limited to, compounds having the formula:

$(R^C)_3Al$;

where $R^C$ is an aliphatic group having from 1 to 10 carbon atoms. For example, $R^C$ can be methyl, ethyl, propyl, butyl, hexyl, or isobutyl.

Other organoaluminum compounds which can be used in catalyst compositions disclosed herein can include, but are not limited to, compounds having the formula:

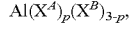

$Al(X^A)_p(X^B)_{3-p}$, where $X^A$ is a hydrocarbyl; $X^B$ is an alkoxide or an aryloxide, a halide, or a hydride; and p is from 1 to 3, inclusive. Hydrocarbyl is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, and/or heteroatom substituted derivatives thereof.

In one aspect, $X^A$ is a hydrocarbyl having from 1 to about 18 carbon atoms. In another aspect of the present invention, $X^A$ is an alkyl having from 1 to 10 carbon atoms. For example, $X^A$ can be methyl, ethyl, propyl, n-butyl, sec-butyl, isobutyl, or hexyl, and the like, in yet another aspect of the present invention.

According to one aspect of the present invention, $X^B$ is an alkoxide or an aryloxide, any one of which has from 1 to 18 carbon atoms, a halide, or a hydride. In another aspect of the present invention, $X^B$ is selected independently from fluorine and chlorine. Yet, in another aspect, $X^B$ is chlorine.

In the formula, $Al(X^A)_p(X^B)_{3-p}$, p is a number from 1 to 3, inclusive, and typically, p is 3. The value of p is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene compound with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention further provides a catalyst composition which can comprise an aluminoxane compound. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

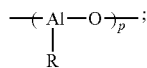

wherein R in this formula is a linear or branched alkyl having from 1 to 10 carbon atoms, and p in this formula is an integer from 3 to 20, are encompassed by this invention. The AlRO moiety shown here also constitutes the repeating unit in a linear aluminoxane. Thus, linear aluminoxanes having the formula:

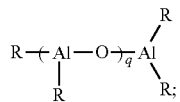

wherein R in this formula is a linear or branched alkyl having from 1 to 10 carbon atoms, and q in this formula is an integer from 1 to 50, are also encompassed by this invention.

Further, aluminoxanes can have cage structures of the formula $R^t_{5r+\alpha}R^b_{r-\alpha}Al_{4r}O_{3r}$, wherein $R^t$ is a terminal linear or branched alkyl group having from 1 to 10 carbon atoms; Rb is a bridging linear or branched alkyl group having from 1 to 10 carbon atoms; r is 3 or 4; and $\alpha$ is equal to $n_{Al(3)}-n_{O(2)}+n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_qAlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_qAlR_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene compound(s) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^C)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes are prepared by reacting an aluminum alkyl compound, such as $(R^C)_3Al$, with a hydrated salt, such as hydrated copper sulfate, in an inert organic solvent.

Organoboron/Organoborate Compounds

According to another aspect of the present invention, the catalyst composition can comprise an organoboron or organoborate compound. Such compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of metallocene compound(s). According to another aspect of this invention, the amount of fluoroorgano boron or fluoroorgano borate compound is from about 0.8 moles to about 5 moles of boron/borate compound per mole of metallocene compound(s).

Ionizing Ionic Compounds

The present invention further provides a catalyst composition which can comprise an ionizing ionic compound. An ionizing ionic compound is an ionic compound that can function as a co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand, from the metallocene. However, the ionizing ionic compound is an activator or co-catalyst regardless of whether it is ionizes the metallocene, abstracts a ligand in a fashion as to form an ion pair, weakens the metal-ligand bond in the metallocene, simply coordinates to a ligand, or activates the metallocene by some other mechanism.

Further, it is not necessary that the ionizing ionic compound activate the metallocene compound(s) only. The activation function of the ionizing ionic compound can be evident in the enhanced activity of catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoro-methyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described above. Styrene can also be employed as a monomer in the present invention. In an aspect, the olefin monomer is a $C_2$-$C_{10}$ olefin; alternatively, the olefin monomer is ethylene; or alternatively, the olefin monomer is propylene.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process comprises ethylene. In this aspect, examples of suitable olefin comonomers include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer can comprise 1-butene, 1-pentene, 1-hexene, 1-octene, 1-decene, styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Composition

In some aspects, the present invention employs catalyst compositions containing an ansa-metallocene compound having formula (I) and an activator, while in other aspects, the present invention employs catalyst compositions containing an ansa-metallocene compound having formula (I) and an activator-support. These catalyst compositions can be utilized to produce polyolefins—homopolymers, copolymers, and the like—for a variety of end-use applications. Metallocene compounds having formula (I) were discussed above. For instance, in one aspect, the ansa-metallocene compound having formula (I) can comprise (or consist essentially of, or consist of) an ansa-metallocene compound having formula (II), formula (III), formula (IV), formula (V), formula (VI), formula (VII), or combinations thereof. Yet, in another aspect, the ansa-metallocene compound having formula (I) can comprise (or consist essentially of, or consist of) an ansa-metallocene compound having formula (C), formula (D), formula (E), or combinations thereof.

In aspects of the present invention, it is contemplated that the catalyst composition can contain more than one metallocene compound having formula (I). Further, additional metallocene compounds—other than those having formula (I)—can be employed in the catalyst composition and/or the polymerization process, provided that the additional metallocene compound(s) does not detract from the advantages disclosed herein. Additionally, more than one activator and/or more than one activator-support also may be utilized.

Generally, catalyst compositions of the present invention comprise an ansa-metallocene compound having formula (I) and an activator. In aspects of the invention, the activator can comprise an activator-support. Activator-supports useful in the present invention were disclosed above. Such catalyst compositions can further comprise one or more than one organoaluminum compound or compounds (suitable organoaluminum compounds also were discussed above). Thus, a catalyst composition of this invention can comprise an ansa-metallocene compound having formula (I), an activator-support, and an organoaluminum compound. For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In another aspect of the present invention, a catalyst composition is provided which comprises an ansa-metallocene compound having formula (I), an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, to be discussed below, in the absence of these additional materials. For example, a catalyst composition of the present invention can consist essentially of an ansa-metallocene compound having formula (I), an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these activators/co-catalysts can be employed. For example, a catalyst composition comprising an ansa-metallocene compound having formula (I) and an activator-support can further comprise an optional co-catalyst. Suitable co-catalysts in this aspect include, but are not limited to, aluminoxane compounds, organoboron or organoborate compounds, ionizing ionic compounds, and the like, or any combination thereof. More than one co-catalyst can be present in the catalyst composition.

In a different aspect, a catalyst composition is provided which does not require an activator-support. Such a catalyst composition can comprise an ansa-metallocene compound having formula (I) and an activator, wherein the activator comprises an aluminoxane compound, an organoboron or organoborate compound, an ionizing ionic compound, or combinations thereof.

This invention further encompasses methods of making these catalyst compositions, such as, for example, contacting the respective catalyst components in any order or sequence.

The ansa-metallocene compound having formula (I) can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the metallocene compound, the olefinic monomer, and the organoaluminum compound typically ranges from a time period of about 1 minute to about 24 hours, for example, from about 3 minutes to about 1 hour. Precontact times from about 10 minutes to about 30 minutes are also employed. Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, an ansa-metallocene compound having formula (I), activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the ansa-metallocene compound having formula (I), the olefin monomer, and the organoaluminum co-catalyst is contacted with the activator-support, this composition (with the addition of the activator-support) is termed the "postcontacted mixture." The postcontacted mixture optionally remains in contact for a second period of time, the postcontact time, prior to initiating the polymerization process. Postcontact times between the precontacted mixture and the activator-support generally range from about 1 minute to about 24 hours. In a further aspect, the postcontact time is in a range from about 3 minutes to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

When a precontacting step is used, the molar ratio of the total moles of olefin monomer to total moles of metallocene(s) in the precontacted mixture is typically in a range from about 1:10 to about 100,000:1. Total moles of each component are used in this ratio to account for aspects of this invention where more than one olefin monomer and/or more than one metallocene compound is employed in a precontacting step. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support is employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of metallocene compound(s) to activator-support is in a range from about 1:1 to about 1:1,000,000. If more than one activator-support is employed, this ratio is based on the total weight of the activator-support. In another aspect, this weight ratio is in a range from about 1:5 to about 1:100,000, or from about 1:10 to about 1:10,000. Yet, in another aspect, the weight ratio of the metallocene compound(s) to the activator-support is in a range from about 1:20 to about 1:1000.

Catalyst compositions of the present invention generally have a catalyst activity greater than about 100 grams of polyethylene (homopolymer, copolymer, etc., as the context requires) per gram of activator-support per hour (abbreviated g/g/hr). In another aspect, the catalyst activity is greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr. This activity is measured under slurry polymerization conditions using isobutane as the diluent, at a polymerization temperature of about 90° C. and a reactor pressure of about 390 psig.

In accordance with another aspect of the present invention, catalyst compositions disclosed herein can have a catalyst activity greater than about 10 grams of polyethylene (homopolymer, copolymer, etc., as the context requires) per μmol of metallocene per hour (abbreviated g/μmol/hr). An activity of 10 g/μmol/hr equates to an activity of 10,000 kg/mol/hr. In another aspect, the catalyst activity of the catalyst composition can be greater than about 15, greater than about 20, or greater than about 25 g/μmol/hr. In still another aspect, catalyst compositions of this invention can be characterized by having a catalyst activity greater than about 30, greater than about 40, or greater than about 50 g/µmol/hr. Yet, in another aspect, the catalyst activity can be greater than about 100 g/µmol/hr. This activity is measured under slurry polymerization conditions using isobutane as the diluent, at a polymerization temperature of about 90° C. and a reactor pressure of about 390 psig.

As discussed above, any combination of the ansa-metallocene compound having formula (I), the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, the metallocene compound, the organoaluminum compound, and 1-hexene can be used in a precontacting step for a first period of time, and this precontacted mixture then can be contacted with the activator-support to form a postcontacted mixture that is contacted for a second period of time prior to initiating the polymerization reaction. For example, the first period of time for contact, the precontact time, between any combination of the metallocene compound, the olefinic monomer, the activator-support, and the organoaluminum compound can be from about 1 minute to about 24 hours, from about 3 minutes to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 1 minute to about 24 hours, or from about 5 minutes to about 1 hour.

Polymerization Process

Catalyst compositions of the present invention can be used to polymerize olefins to form homopolymers, copolymers, terpolymers, and the like. One such process for polymerizing olefins in the presence of a catalyst composition of the present invention comprises contacting the catalyst composition with an olefin monomer and optionally an olefin comonomer (one or more) under polymerization conditions to produce an olefin polymer, wherein the catalyst composition comprises an ansa-metallocene compound having formula (I) and an activator. Metallocene compounds having formula (I):

$$E(Cp^A R^A_m)(Cp^B R^B_n)MX_q \qquad (I),$$

were discussed above. For instance, in one aspect, the ansa-metallocene compound having formula (I) can comprise (or consist essentially of, or consist of) an ansa-metallocene compound having formula (II), formula (III), formula (IV), formula (V), formula (VI), formula (VII), or combinations thereof. Yet, in another aspect, the ansa-metallocene compound having formula (I) can comprise (or consist essentially of, or consist of) an ansa-metallocene compound having formula (C), formula (D), formula (E), or combinations thereof.

In accordance with one aspect of the invention, the polymerization process employs a catalyst composition comprising an ansa-metallocene compound having formula (I) and an activator, wherein the activator comprises an activator-support. Activator-supports useful in the polymerization processes of the present invention were disclosed above. The catalyst composition can further comprise one or more than one organoaluminum compound or compounds (suitable organoaluminum compounds also were discussed above). Thus, a process for polymerizing olefins in the presence of a catalyst composition can employ a catalyst composition comprising an ansa-metallocene compound having formula (I), an activator-support, and an organoaluminum compound. In some aspects, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another aspect of the invention, the polymerization process can employ a catalyst composition comprising an ansa-metallocene compound having formula (I) and an activator, wherein the activator comprises an aluminoxane compound, an organoboron or organoborate compound, an ionizing ionic compound, or combinations thereof.

The catalyst compositions of the present invention are intended for any olefin polymerization method using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that may be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series, in parallel, or both.

According to one aspect of the invention, the polymerization reactor system may comprise at least one loop slurry reactor comprising vertical or horizontal loops. Monomer, diluent, catalyst, and comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature may be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally is within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and optionally an olefin comonomer under polymerization conditions to produce an olefin polymer. The olefin polymer produced by the process can have a density greater than about 0.92 g/cm$^3$, for instance, in a range from about 0.935 to about 0.97 g/cm$^3$. In addition, or alternatively, the olefin polymer can have an average of less than about 5 short chain branches (SCB's) per 1000 total carbon atoms, for instance, from 0 to about 4 SCB's per 1000 total carbon atoms. In addition, or alternatively, the olefin polymer can have less than about 0.005 long chain branches (LCB's) per 1000 total carbon atoms, for instance, less than about 0.002, or less than about 0.001, LCB's per 1000 total carbon atoms.

Aspects of this invention also are directed to olefin polymerization processes conducted in the absence of added hydrogen. In this disclosure, "added hydrogen" will be denoted as the feed ratio of hydrogen to olefin monomer entering the reactor (in units of ppm). An olefin polymerization process of this invention can comprise contacting a catalyst composition with an olefin monomer and optionally an olefin comonomer under polymerization conditions to produce an olefin polymer, wherein the catalyst composition comprises an ansa-metallocene compound having formula (I)

and an activator, wherein the polymerization process is conducted in the absence of added hydrogen. As disclosed above, the ansa-metallocene compound having formula (I) can comprise an ansa-metallocene compound having formula (II), formula (III), formula (IV), formula (V), formula (VI), formula (VII), formula (C), formula (D), formula (E), or combinations thereof. As one of ordinary skill in the art would recognize, hydrogen can be generated in-situ by metallocene catalyst compositions in various olefin polymerization processes, and the amount generated may vary depending upon the specific catalyst composition and metallocene compound(s) employed, the type of polymerization process used, the polymerization reaction conditions utilized, and so forth.

In one aspect, the polymerization process is conducted in the absence of added hydrogen, and the Mw/Mn ratio of the olefin polymer produced by the process can increase as the molar ratio of olefin comonomer to olefin monomer increases from about 0.001:1 to about 0.06:1. For instance, the Mw/Mn of the polymer produced by the process at a comonomer:monomer molar ratio of 0.06:1 can be greater than the Mw/Mn of the polymer produced by the process at a comonomer:monomer molar ratio of 0.005:1, when produced under the same polymerization conditions. Additionally, the Mw/Mn of the polymer produced by the process at a comonomer:monomer molar ratio of 0.05:1 can be greater than the Mw/Mn of the polymer produced by the process at a comonomer:monomer molar ratio of 0.01:1, when produced under the same polymerization conditions. Applicants also contemplate a method of increasing a Mw/Mn ratio of an olefin polymer, and this method comprises contacting a catalyst composition with an olefin monomer and an olefin comonomer under polymerization conditions to produce the olefin polymer; contacting the catalyst composition with the olefin monomer and the olefin comonomer in the absence of added hydrogen; and increasing the molar ratio of olefin comonomer to olefin monomer within the range of from about 0.001:1 to about 0.2:1, wherein the catalyst composition comprises an ansa-metallocene compound having formula (I) and an activator (e.g., an activator-support). For instance, the molar ratio can be increased from a lower ratio (e.g., 0.001:1, 0.005:1, etc.) to a higher ratio (e.g., 0.01:1, 0.05:1).

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer under polymerization conditions to produce an olefin polymer, wherein the catalyst composition comprises an ansa-metallocene compound having formula (I) and an activator, wherein the polymerization process is conducted in the presence of added hydrogen. For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In another aspect, the polymerization process is conducted in the presence of added hydrogen and the olefin comonomer, and the Mw of the olefin polymer is substantially constant over a range of from about 50 ppm to about 1000 ppm added hydrogen; alternatively, from about 75 ppm to about 750 ppm added hydrogen; alternatively, from about 75 ppm to about 500 ppm added hydrogen; or alternatively, from about 100 ppm to about 500 ppm added hydrogen. As it pertains to the Mw of the olefin polymer, substantially constant means +/−25%. In some aspects, however, the Mw can be within a +/−15% range. Applicants also contemplate a method of producing an olefin polymer having a Mw that is substantially independent of hydrogen content, and this method comprises contacting a catalyst composition with an olefin monomer and an olefin comonomer under polymerization conditions to produce the olefin polymer; and contacting the catalyst composition with the olefin monomer and the olefin comonomer in the presence of added hydrogen in the range of from about 50 ppm to about 1000 ppm (alternatively, from about 75 ppm to about 750 ppm; alternatively, from about 75 ppm to about 500 ppm; or alternatively, from about 100 ppm to about 500 ppm), wherein the catalyst composition comprises an ansa-metallocene compound having formula (I) and an activator (e.g., an activator-support). Similar to above, the olefin polymer having a Mw that is substantially independent of hydrogen content means that the Mw stays within a +/−25% range in the targeted range of ppm added hydrogen (e.g., from 100 to 500 ppm). Often, the Mw will fall within a +/−15% range over certain hydrogen content ranges.

In another aspect, an olefin polymerization process can comprise contacting a catalyst composition with an olefin monomer and optionally an olefin comonomer under polymerization conditions to produce an olefin polymer, wherein the catalyst composition comprises an ansa-metallocene compound having formula (I) and an activator, wherein the polymerization process is conducted in the presence of hydrogen added in a range of from about 50 ppm to about 1000 ppm hydrogen, or from about 75 ppm to about 750 ppm, or from about 75 ppm to about 500 ppm, or from about 100 ppm to about 500 ppm. In the presence of these ppm hydrogen contents, a Mw of an olefin polymer produced by the process in the presence of an olefin comonomer can be at least 25% greater than a Mw of an olefin polymer produced by the process under the same polymerization conditions without the olefin comonomer (e.g., from 25% to 200% greater, from 30% to 100% greater, etc.). For instance, the Mw of the olefin polymer produced by the process in the presence of the olefin comonomer can be at least 30% greater, 40% greater, 50% greater, or 60% greater, than a Mw of an olefin polymer produced by the process under the same polymerization conditions without the olefin comonomer. Similarly, in the presence of these ppm added hydrogen contents, a Mw/Mn ratio of an olefin polymer produced by the process in the presence of an olefin comonomer can be at least 15% greater than a Mw/Mn ratio of an olefin polymer produced by the process under the same polymerization conditions without the olefin comonomer (e.g., from 15% to 200% greater, from 15% to 100% greater, etc.). As further examples, the Mw/Mn ratio of the olefin polymer produced by the process in the presence of the olefin comonomer can be at least 20% greater, 25% greater, 30% greater, 40% greater, or 50% greater, than a Mw/Mn of an olefin polymer produced by the process under the same polymerization conditions without the olefin comonomer. Applicants also contemplate a method of increasing the Mw (or Mw/Mn ratio) of an olefin polymer, and this method comprises introducing an olefin comonomer to a contact product of a catalyst composition an olefin monomer under polymerization conditions to produce the olefin polymer; and introducing the olefin comonomer to the contact product of the catalyst composition and the olefin monomer in the presence of added hydrogen in the range of from about 50 ppm to about 1000 ppm (alternatively, from about 75 ppm to about 750 ppm; alternatively, from about 75 ppm to about 500 ppm; or alternatively, from about 100 ppm to about 500 ppm), wherein the catalyst composition comprises an ansa-metallocene compound having formula (I) and an activator (e.g., an activator-support). The Mw (or Mw/Mn ratio) may be increased by the introduction of the olefin comonomer by at least 15%, at least 20%, at least 25%, at least 30%, at least 35%, at least 40%, at least 45%, or at least 50%, as compared to the Mw (or Mw/Mn ratio) of the olefin polymer produced in the absence of the olefin comonomer (e.g., from 15% to 200% greater, from 20% to 150% greater, etc.). Typically, the amount of comonomer introduced is in a molar ratio of olefin comonomer to olefin monomer range of from about 0.001:1 to about 0.2:1, or from about 0.005:1 to about 0.1:1, or from about 0.01:1 to about 0.05:1.

In another aspect, the catalyst activity of the catalyst composition may vary with comonomer content and/or may be substantially constant with added hydrogen content. For example, an olefin polymerization process of this invention can comprise contacting a catalyst composition with an olefin monomer and optionally an olefin comonomer under polymerization conditions to produce an olefin polymer, wherein the activity of the catalyst composition can decrease as the molar ratio of olefin comonomer to olefin monomer increases from about 0.001:1 to about 0.06:1. Accordingly, the activity of the catalyst composition at a comonomer:monomer molar ratio of 0.06:1 can be less than the activity of the catalyst composition at a comonomer:monomer molar ratio of 0.005:1, when determined under the same polymerization conditions. Additionally, the activity of the catalyst composition at a comonomer:monomer molar ratio of 0.05:1 can be less than the activity of the catalyst composition at a comonomer:monomer molar ratio of 0.01:1, when determined under the same polymerization conditions. Applicants also contemplate a method of increasing the activity of a catalyst composition, and this method comprises contacting the catalyst composition with an olefin monomer and an olefin comonomer under polymerization conditions to produce the olefin polymer; and decreasing the molar ratio of olefin comonomer to olefin monomer within the range of from about 0.2:1 to about 0.001:1, wherein the catalyst composition comprises an ansa-metallocene compound having formula (I) and an activator (e.g., an activator-support). For instance, the molar ratio can be decreased from a higher ratio (e.g., 0.01:1, 0.05:1) to a lower ratio (e.g., 0.001:1, 0.005:1, etc.).

In another aspect, an olefin polymerization process of this invention can comprise contacting a catalyst composition with an olefin monomer and an olefin comonomer under polymerization conditions to produce an olefin polymer, wherein the catalyst composition comprises an ansa-metallocene compound having formula (I) and an activator, wherein the polymerization process is conducted in the presence of added hydrogen, and wherein the activity of the catalyst composition is substantially constant over a range of from about 50 ppm to about 1000 ppm added hydrogen; alternatively, from about 75 ppm to about 750 ppm added hydrogen; alternatively, from about 75 ppm to about 500 ppm added hydrogen; or alternatively, from about 100 ppm to about 500 ppm added hydrogen. As it pertains to the activity of the catalyst composition, substantially constant means +/−25%. In some aspects, however, the activity of the catalyst composition can be within a +/−15% range. This catalyst activity can be substantially constant at a given comonomer concentration. Applicants also contemplate a method of producing an olefin polymer at a catalyst activity that is substantially independent of hydrogen content, and this method comprises contacting a catalyst composition with an olefin monomer and an olefin comonomer under polymerization conditions to produce the olefin polymer; and contacting the catalyst composition with the olefin monomer and the olefin comonomer in the presence of added hydrogen in the range of from about 50 ppm to about 1000 ppm (alternatively, from about 75 ppm to about 750 ppm; alternatively, from about 75 ppm to about 500 ppm; or alternatively, from about 100 ppm to about 500 ppm), wherein the catalyst composition comprises an ansa-metallocene compound having formula (I) and an activator (e.g., an activator-support). Similar to above, the catalyst composition having an activity that is substantially independent of hydrogen content means that the catalyst activity stays within a +/−25% range in the targeted range of ppm added hydrogen (e.g., from 100 to 500 ppm). Often, the catalyst activity will fall within a +/−15% range over certain hydrogen content ranges.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and/or can comprise, the ethylene polymers of this invention, whose typical properties are provided below.

Polymers of ethylene (copolymers, terpolymers, etc.) produced in accordance with this invention generally have a melt index from 0 to about 100 g/10 min. Melt indices in the range from 0 to about 75 g/10 min, from 0 to about 50 g/10 min, or from 0 to about 30 g/10 min, are contemplated in some aspects of this invention. For example, a polymer of the present invention can have a melt index (MI) in a range from 0 to about 25, or from 0 to about 10 g/10 min.

Ethylene polymers produced in accordance with this invention can have a ratio of HLMI/MI of greater than about 5, such as, for example, greater than about 10, greater than about 15, or greater than about 20. Contemplated ranges for HLMI/MI include, but are not limited to, from about 5 to about 150, from about 10 to about 125, from about 10 to about 100, from about 15 to about 90, from about 15 to about 80, from about 15 to about 70, or from about 15 to about 65.

In some aspects of this invention, the catalyst systems disclosed herein may be referred to as comonomer rejecters, i.e., comonomer is not as readily incorporated into an olefin polymer when compared to other bridged metallocene catalyst systems. Accordingly, the densities of ethylene-based polymers produced using the catalyst systems and processes disclosed herein often are greater than about 0.92 g/cm³. In one aspect of this invention, the density of an ethylene polymer can be greater than about 0.925, greater than about 0.93, or greater than about 0.935 g/cm³. Yet, in another aspect, the density can be in a range from about 0.92 to about 0.97 g/cm³, such as, for example, from about 0.925 to about 0.97 g/cm³, from about 0.93 to about 0.965 g/cm³, or from about 0.935 to about 0.965 g/cm³.

Ethylene polymers of this invention generally can have an average of from 0 to about 5 short chain branches (SCB's) per 1000 total carbon atoms. For example, average SCB contents in a range from 0 to about 4.5, from 0 to about 4, from 0 to about 3.5, or from 0 to about 3, SCB's per 1000 total carbon atoms are contemplated herein.

Ethylene polymers, such as copolymers and terpolymers, within the scope of the present invention generally have a polydispersity index—a ratio of the weight-average molecular weight (Mw) to the number-average molecular weight (Mn)—in a range from 2 to about 10. In some aspects disclosed herein, the ratio of Mw/Mn is in a range from about 2.1 to about 9, from about 2.1 to about 8, or from about 2.2 to about 7. The ratio of Mz/Mw for the polymers of this invention often is in a range from about 1.6 to about 12. Mz is the z-average molecular weight. In accordance with one aspect, the Mz/Mw of the ethylene polymers of this invention can be in a range from about 1.6 to about 10, from about 1.7 to about 6, from about 1.7 to about 4, or from about 1.7 to about 3.5.

Generally, olefin polymers of the present invention have low levels of long chain branching, with typically less than 0.05 long chain branches (LCB's) per 1000 total carbon atoms. In some aspects, the number of LCB's per 1000 total carbon atoms is less than about 0.02, less than about 0.01, or less than about 0.008. Furthermore, olefin polymers of the present invention (e.g., ethylene polymers) can have less than about 0.005, less than about 0.004, less than about 0.003, less than about 0.002, or less than about 0.001 LCB's per 1000 total carbon atoms, in other aspects of this invention.

Polymers of ethylene, whether homopolymers, copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cm³) on a compression molded sample, cooled at about 15° C. per hour, and conditioned for about 40 hours at room temperature in accordance with ASTM D1505 and ASTM D1928, procedure C.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300 mm) and were calibrated with a broad linear polyethylene standard (Phillips Marlex® BHB 5003) for which the molecular weight had been determined.

SEC-MALS combines the methods of size exclusion chromatography (SEC) with multi-angle light scattering (MALS) detection. A DAWN EOS 18-angle light scattering photometer (Wyatt Technology, Santa Barbara, Calif.) was attached to a PL-210 SEC system (Polymer Labs, UK) or a Waters 150 CV Plus system (Milford, Mass.) through a hot transfer line, thermally controlled at the same temperature as the SEC columns and its differential refractive index (DRI) detector (145° C.). At a flow rate setting of 0.7 mL/min, the mobile phase, 1,2,4-trichlorobenzene (TCB), was eluted through three, 7.5 mm×300 mm, 20 μm Mixed A-LS columns (Polymer Labs). Polyethylene (PE) solutions with concentrations of ~1.2 mg/mL, depending on samples, were prepared at 150° C. for 4 h before being transferred to the SEC injection vials sitting in a carousel heated at 145° C. For polymers of higher molecular weight, longer heating times were necessary in order to obtain true homogeneous solutions. In addition to acquiring a concentration chromatogram, seventeen light-scattering chromatograms at different angles were also acquired for each injection using Wyatt's Astra® software. At each chromatographic slice, both the absolute molecular weight (M) and root mean square (RMS) radius, also known as radius of gyration (Rg) were obtained from a Debye plot's intercept and slope, respectively. Methods for this process are detailed in Wyatt, P. J., *Anal. Chim. Acta*, 272, 1 (1993), which is incorporated herein by reference in its entirety.

The Zimm-Stockmayer approach was used to determine the amount of LCB. Since SEC-MALS measures M and Rg at each slice of a chromatogram simultaneously, the branching indices, $g_M$, as a function of M could be determined at each slice directly by determining the ratio of the mean square Rg of branched molecules to that of linear ones, at the same M, as shown in following equation (subscripts br and lin represent branched and linear polymers, respectively).

$$g_M = \frac{\langle R_g \rangle_{br}^2}{\langle R_g \rangle_{lin}^2}.$$

At a given $g_M$, the weight-averaged number of LCB per molecule ($B_{3w}$) was computed using Zimm-Stockmayer's equation, shown in the equation below, where the branches were assumed to be trifunctional, or Y-shaped.

$$g_M = \frac{6}{B_{3w}} \left\{ \frac{1}{2} \left( \frac{2+B_{3w}}{B_{3w}} \right)^{1/2} \ln \left[ \frac{(2+B_{3w})^{1/2}+(B_{3w})^{1/2}}{(2+B_{3w})^{1/2}-(B_{3w})^{1/2}} \right] - 1 \right\}.$$

LCB frequency ($LCB_{Mi}$), the number of LCB per 1000 C, of the $i^{th}$ slice was then computed straightforwardly using the following equation ($M_i$ is the MW of the $i^{th}$ slice):

$LCB_{Mi}$=1 000*14*$B_{3w}/M_i$.

The LCB distribution (LCBD) across the molecular weight distribution (MWD) was thus established for a full polymer.

Short chain branching distribution (SCBD) data was obtained using a SEC-FTIR high temperature heated flow cell (Polymer Laboratories) as described by P. J. DesLauriers, D. C. Rohlfing, and E. T. Hsieh, *Polymer*, 43, 159 (2002).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency (w) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1+(\tau_\eta \omega)^a]^{(1-n)/a}},$$

wherein:
$|\eta^*(\omega)|$=magnitude of complex shear viscosity;
$\eta_0$=zero shear viscosity;
$\tau_\eta$=viscous relaxation time;
a="breadth" parameter;
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Nuclear Magnetic Resonance (NMR) spectra were obtained on a Varian Mercury Plus 300 NMR spectrometer. $CDCl_3$ and $C_6D_6$ were purchased from Cambridge Isotope Laboratories, degassed and stored over activated 13× molecular sieves under nitrogen. NMR spectra were recorded using capped or J. Young NMR tubes at ambient probe conditions. $^1H$ chemical shifts are reported versus $SiMe_4$ and were determined by reference to the residual $^1H$ and solvent peaks. Coupling constants are reported in Hz.

Gas chromatography was performed using a Varian 3800 GC analyzer fitted with dual Factor Four all-purpose capillary columns (30 m×0.25 mm), flame ionization detector, and Varian 8400 autosampler unit. Mass spectral analysis was performed in conjunction with a Varian 320 MS instrument using electron ionization at 70 eV.

The sulfated alumina activator-support (abbreviated ACT1) employed in some of the examples was prepared in accordance with the following procedure. Bohemite was obtained from W.R. Grace Company under the designation "Alumina A" and having a surface area of about 300 $m^2/g$ and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina activator-support (ACT1) was collected and stored under dry nitrogen, and was used without exposure to the atmosphere.

The fluorided silica-alumina activator-support (abbreviated ACT2) employed in some of the examples was prepared in accordance with the following procedure. A silica-alumina was obtained from W.R. Grace Company containing about 13% alumina by weight and having a surface area of about 400 $m^2/g$ and a pore volume of about 1.2 mL/g. This material was obtained as a powder having an average particle size of about 70 microns. Approximately 100 grams of this material were impregnated with a solution containing about 200 mL of water and about 10 grams of ammonium hydrogen fluoride, resulting in a damp powder having the consistency of wet sand. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 450° C. At this temperature, the powder was allowed to fluidize for about three hours in the dry air. Afterward, the fluorided silica-alumina activator-support (ACT2) was collected and stored under dry nitrogen, and was used without exposure to the atmosphere.

The fluorided silica-alumina activator-support (abbreviated ACT4) employed in some of the examples was prepared in accordance with the following procedure. A silica-coated alumina was obtained from Sasol Company under the designation "Siral 28M" containing about 72% alumina by weight, and having a surface area of about 340 $m^2/g$, a pore volume of about 1.6 mL/g, and an average particle size of about 90 microns. About 20 g of the Siral 28M was first calcined at about 600° C. for approximately 8 hours, then impregnated to incipient wetness with 60 mL of a methanol solution containing 2 g of ammonium bifluoride. This mixture was then placed in a flat pan and allowed to dry under vacuum at approximately 110° C. for about 12 hours.

To calcine the support, the powdered mixture was placed in a 2-inch bed fluidized by dry nitrogen. The temperature was ramped up to 600° C. over a period of 1.5 hours, and then held at 600° C. for three hours. Afterward, the fluorided silica-coated alumina (ACT4) was collected and stored under dry nitrogen, and was used without exposure to the atmosphere.

The titanated fluorided silica-alumina activator-support (abbreviated ACT3) employed in some of the examples was prepared in accordance with the following procedure. A silica-coated alumina was obtained from Sasol Company under the designation "Siral 28M" containing about 72% alumina by weight, and having a surface area of about 340 m$^2$/g, a pore volume of about 1.6 mL/g, and an average particle size of about 90 microns. About 682 g of the Siral 28M was first calcined at about 600° C. for approximately 8 hours, then impregnated to incipient wetness with 2200 mL of a methanol solution containing 147 g of a solution containing 60% $H_2TiF_6$. This mixture, with the consistency of wet sand, was then placed in a flat pan and allowed to dry under vacuum at approximately 110° C. for about 12 hours.

To calcine the support, the powdered mixture was placed in a 2-inch bed fluidized by dry nitrogen. The temperature was ramped up to 600° C. over a period of 1.5 hours, and then held at 600° C. for three hours. Afterward, the titanated fluorided silica-coated alumina (ACT3) was collected and stored under dry nitrogen, and was used without exposure to the atmosphere.

The polymerization runs were conducted in a one-gallon (3.8-liter) stainless steel reactor as follows. First, the reactor was purged with nitrogen and then with isobutane vapor. Approximately 0.5 mL of a 1M solution in heptane of either triisobutylaluminum (TIBA) or triethylaluminum (TEA), the activator-support (ACT1, ACT2, ACT3, or ACT4), and the metallocene (MET1, MET2, or MET3; structures provided below) were added through a charge port while venting isobutane vapor. The charge port was closed and about 2 L of isobutane were added. The resulting mixture was stirred for 5 min, and then heated to the desired polymerization temperature. Upon approaching the polymerization reactor temperature, ethylene was charged to the reactor to achieve the desired total reactor pressure, along with a desired amount of 1-hexene comonomer (if used). Ethylene was fed on demand as the polymerization reaction proceeded to maintain constant reactor pressure. If used, hydrogen was added at a fixed mass ratio with respect to the ethylene flow. The reactor was maintained and controlled at the desired temperature and reactor pressure throughout the 60 min run time of the polymerization. Upon completion, the isobutane and ethylene were vented from the reactor, the reactor was opened and cooled, and the polymer product was collected and dried.

Examples 1-99

Polymers Produced Using an Ansa-Metallocene Having Formula (I)

Metallocene compounds used in these examples had the following structures and abbreviations:

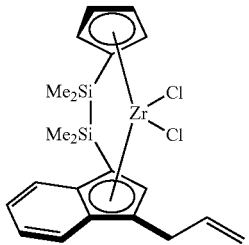

MET1

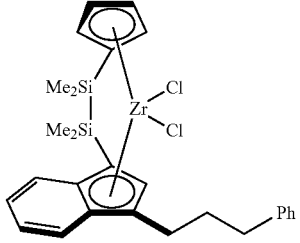

MET2

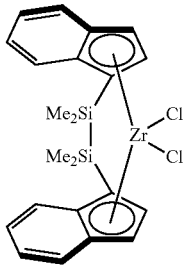

MET3

Synthesis of MET1:

A solution of 1,2-dichloro-1,1,2,2-tetramethyldisilane (2.29 g, 12.3 mmol) in $Et_2O$ (25 mL) was prepared. A solution of Li(allyl-indenyl) (1.00 g, 6.17 mmol) in $Et_2O$ (25 mL) was prepared and added dropwise by cannula to the stirred disilane solution at approximately 22° C. over 1 hr. The mixture was stirred overnight and evaporated under vacuum. The residue was suspended in toluene (20 mL), filtered through a pad of Celite and an aliquot of the filtrate was removed. NMR analysis showed the presence of $Me_4Si_2$(allyl-indenyl)Cl and starting disilane. $^1$H NMR data for $Me_4Si_2$(allyl-indenyl)Cl ($C_6D_6$): δ 7.31 (d, J=8, 2H, $C_6$-Ind), 7.19 (t, J=8, 1H, $C_6$-Ind), 7.08 (t, J=8, 1H, $C_6$-Ind), 6.22 (m, 1H, $C_5$-Ind), 5.96 (m, 1H, CH=$CH_2$), 5.14 (m, 1H, CH=$CH_2$), 5.06 (m, 1H, CH=$CH_2$), 3.30 (m, $C_5$-Ind), 3.20 (m, 2H, $CH_2$), 0.21 (s, 3H, SiMe), 0.15 (s, 3H, SiMe), 0.12 (s, 3H, SiMe), −0.09 (s, 3H, SiMe). The filtrate was evaporated and dried under vacuum overnight to obtain a yellow oil (1.9 g). THF (20 mL) was added by cannula, and a solution of cyclopentadienyl-MgCl (7.0 mL, 1.0 M in THF, 7.0 mmol) was added dropwise by syringe to the stirred solution at approximately 22° C. over 15 min. The mixture was stirred for 2 hr and an aliquot was removed by syringe. GC-MS analysis showed about 95% conversion to the expected ligand $Me_4Si_2$(allyl-indenyl)(cyclopentadienyl) (m/z, 337 {M$^+$}), with the balance comprised of products derived from the starting materials. The mixture was stirred an additional 1 hr and evaporated under vacuum. The residue was dried under vacuum at 35° C. for 1 hr and toluene (20 mL) was added. The suspension was filtered through a pad of Celite and the Celite was washed with toluene (2×20 mL). The toluene solutions were combined and evaporated under vacuum to obtain a yellow oil (2.05 g). $Et_2O$ (50 mL) was added and the resulting solution was cooled in an ice water bath. A solution of n-BuLi (5.1 mL, 2.5 M in hexanes, 13 mmol) was added by syringe over 3 min and the stirred mixture was warmed to room temperature over 30 min. A suspension of $ZrCl_4$ (1.49 g, 6.39 mmol) in heptane (50 mL) was prepared and cooled in an ice water bath. The lithium solution was added dropwise by cannula to the stirred zirconium suspension over 30 min, and the mixture was stirred in the bath overnight. The bright yellow slurry was evaporated under vacuum and $CH_2Cl_2$ (50 mL) was added by cannula. The suspension was filtered through a pad of Celite and the Celite was washed with $CH_2Cl_2$ (2×20 mL). The resulting solutions were combined and evaporated under vacuum to obtain a dark yellow solid (2.76 g). The residue was recrystallized from toluene (10 mL) at −30° C. to obtain MET1 as a yellow crystalline solid, which was dried under vacuum (900 mg, 29% recrystallized yield based on Li(allyl-indenyl). $^1$H NMR (CDCl$_3$): δ 7.73 (d, J=8, 1H, C$_6$-Ind), 7.63 (d, J=8, 1H, C$_6$-Ind), 7.32 (t, J=8, 1H, C$_6$-Ind), 7.24 (t, J=8, 1H, C$_6$-Ind), 6.73 (m, 1H, Cp), 6.72 (s, 1H, C$_5$-Ind), 6.41 (m, 1H, Cp), 6.18 (m, 1H, Cp), 6.13 (m, 1H, Cp), 6.01 (m, 1H, CH=CH$_2$), 5.16 (m, 1H, CH=CH$_2$), 5.11 (m, 1H, CH=CH$_2$), 3.72 (d, J=7, 2H, CH$_2$), 0.62 (s, 3H, SiMe), 0.58 (s, 3H, SiMe), 0.55 (s, 3H, SiMe), 0.52 (s, 3H, SiMe).

Synthesis of MET2:

A solution of indene (10.0 mL, 86.1 mmol) in Et$_2$O (200 mL) was prepared and cooled in dry ice/acetone. A solution of n-BuLi (34.5 mL, 2.5 M, 86 mmol) was added by syringe over 3 min. The bath was removed and the mixture was stirred for 4 hr, and then cooled again in dry ice/acetone. Neat 1-bromo-3-phenylpropane (13.1 mL, 86.1 mmol) was added by syringe over 1 min and the stirred mixture was slowly warmed out of the bath to approximately 22° C. overnight. The mixture was slowly quenched with water (5 mL) and then additional water (50 mL) was added. The biphasic mixture was shaken, the organic layer was separated, dried over MgSO$_4$, filtered and evaporated under vacuum to obtain (3-phenylpropyl)-1H-indene as a yellow oil (18.61 g, 95 mol % purity based on GC analysis). GC-MS: m/z, 234 (M$^+$). A solution of (3-phenylpropyl)-1H-indene (3.00 g, 12.8 mmol) in Et$_2$O (50 mL) was prepared and cooled in an ice water bath. A solution of n-BuLi (5.1 mL, 2.5 M, 13 mmol) was added by syringe over 30 sec, the bath was removed and the mixture was stirred for 1.5 hr. A solution of Me$_4$Si$_2$Cl$_2$ (4.92 g, 26.2 mmol) in Et$_2$O (25 mL) was prepared and the Li(indenyl) solution was added dropwise by cannula to the stirred disilane solution at approximately 22° C. over 1 hr. The mixture was stirred overnight, and then evaporated and dried under vacuum for 4 hr to obtain a yellow oil. THF (50 mL) was added by cannula and a solution of cyclopentadienyl-MgCl (14.0 mL, 1.0 M in THF, 14 mmol) was added to the stirred solution by syringe over 5 min. The mixture was stirred overnight, evaporated under vacuum, triturated with toluene (20 mL), allowed to settle, and the supernatant decanted. The trituration procedure was repeated and the toluene solutions were combined and evaporated under vacuum to obtain an orange oil (4.11 g). Et$_2$O (75 mL) was added by cannula, and the resulting mixture was cooled in an ice bath. A solution of n-BuLi (8.1 mL, 2.5 M in hexanes, 20 mmol) was added by syringe over 1 min to obtain a fine suspension. The bath was removed and the stirred suspension was warmed to approximately 22° C. over 2 hr. THF (1.6 mL) was added by syringe. A suspension of ZrCl$_4$ (2.37 g, 10.2 mmol) in heptane (75 mL) was prepared and cooled in an ice water bath. The lithium solution was added dropwise by cannula to the stirred zirconium suspension over 20 min, and the mixture was warmed to approximately 22° C. overnight. The volatiles were removed under vacuum and CH$_2$Cl$_2$ (100 mL) was added by cannula. The suspension was filtered through a pad of Celite and the Celite was washed with CH$_2$Cl$_2$ (2×20 mL). The filtrate and washes were combined and evaporated under vacuum to obtain a dark yellow solid (5.79 g). The residue was triturated in 1/1 toluene/heptane (20 mL) at stored at −30° C. to precipitate impurities. The supernatant was decanted and evaporated under vacuum, and the trituration procedure was repeated. The supernatant was decanted and evaporated to obtain MET2 as an orange oil (3.03 g).

Synthesis of MET3:

Portions of the following synthesis procedure were based on a method described in the Journal of Organometallic Chemistry, 1999, 585, 18-25, the disclosure of which is incorporated herein by reference in its entirety. A solution of indene (95 mole percent purity, 10 mL, 81.8 mmol) in Et$_2$O (200 mL) was prepared, cooled in dry ice/acetone, and charged with a solution of n-BuLi (33 mL, 2.5 M in hexanes, 83 mmol) by syringe over 1 min. The solution was stirred and allowed to warm slowly to approximately 22° C. over 16 hr. A separate solution of 1,2-dichloro-1,1,2,2-tetramethyldisilane (7.54 g, 40.3 mmol) in Et$_2$O (100 mL) was prepared and cooled in ice water. The prepared Li-Ind solution was added dropwise by cannula to the disilane solution over 1 hr. The resulting pale-yellow suspension was stirred and warmed slowly to approximately 22° C. over 16 hr. The solution was evaporated under vacuum resulting in a beige solid. Toluene (75 mL) was added by cannula and the resulting suspension was centrifuged. The supernatant solution was removed by cannula, and this toluene extraction procedure was repeated to produce two toluene extracts. The two extracts were combined and evaporated to a volume of approximately 75 mL. The resulting suspension was warmed to 40° C. in a hot water bath, and stirred to dissolve the precipitated solid. The stirring was halted upon complete dissolution of the solid, and then the solution was allowed to cool slowly to approximately 22° C. for about 16 hours. The supernatant solution was decanted by cannula and the resulting precipitate was dried under vacuum to obtain rac/meso-1,2-bis(inden-1-yl)-1,1,2,2-tetramethyldisilane as an amber, crystalline solid (5.55 g). The supernatant solution was concentrated and a recrystallization procedure analogous to the aforementioned was repeated twice to obtain two additional amounts of the rac/meso-bridged ligand (2.83 g and 1.52 g, respectively) exhibiting comparable NMR purity to that of the first. Total isolated yield of rac/meso-1,2-bis(inden-1-yl)-1,1,2,2-tetramethyldisilane was 9.90 g, 71%. $^1$H NMR data indicated the presence of a 2/1 mixture of diastereomers, neither of which could be unambiguously characterized as rac or meso due to the presence of symmetry elements in both cases. Key $^1$H NMR data for the major isomer (CDCl$_3$): δ 6.28 (dd, J=5, 2; 2H, C$_5$-Ind), 3.16 (s, 2H, C$_5$-Ind), −0.18 (s, 6H, SiMe$_2$), −0.30 (s, 6H, SiMe$_2$). Key $^1$H NMR data for the minor isomer (CDCl$_3$): δ 6.42 (dd, J=5, 2; 2H, C$_5$-Ind), 3.27 (s, 2H, C$_5$-Ind), −0.10 (s, 6H, SiMe$_2$), −0.45 (s, 6H, SiMe$_2$). A solution of rac/meso-1,2-bis(inden-1-yl)-1,1,2,2-tetramethyldisilane (2.82 g, 8.14 mmol) in Et$_2$O (75 mL) was prepared, cooled to −5° C., and charged with a solution of n-BuLi (6.7 mL, 2.5 M in hexanes, 17 mmol) by syringe over 30 sec. The mixture was stirred for 10 min, and then allowed to warm to approximately 22° C. over 16 hr while stirring. A suspension of ZrCl$_4$ (1.90 g, 8.14 mmol) in toluene (50 mL) was prepared and cooled to −5° C. The lithiated bis(indenide) solution obtained from the rac/meso-bridged ligand was added to the stirred zirconium suspension by cannula over 30 sec. The cooling bath was removed and the resulting yellow-orange suspension was stirred and warmed to approximately 22° C. over 16 hr. The yellow suspension was evaporated under vacuum and toluene (50 mL) was added by cannula. The suspension was centrifuged, and the supernatant solution was removed by cannula and evaporated under vacuum at 40° C. to obtain rac/meso-MET3 (1:1 rac/meso) as a yellow solid. The solid was recrystallized twice from toluene to obtain pure meso-MET3. NMR data for these samples in $CDCl_3$ solution matched those reported in the Journal of Organometallic Chemistry, 1999, 585, 18-25, for the MET3 compound.

Polymerization Experiments:

The polymerization conditions and the resultant polymer properties for Examples 1-99 are summarized in Table I. Any listing of MET3 in Table I is meant to indicate the meso isomer of MET3, i.e., meso-MET3. The $H_2$ feed in ethylene is listed in ppm on a weight basis (ppmw). Applicants believe that a quality issue with the batch of co-catalyst used in Examples 91-93 may have adversely affected the catalyst activity and the polymer properties of these examples.

FIG. 1 illustrates the molecular weight distributions of the polymers of Examples 3, 5, and 7. For the copolymers of these examples, FIG. 1 demonstrates that Mw was substantially constant over a range of amounts of added hydrogen.

Figure 2:
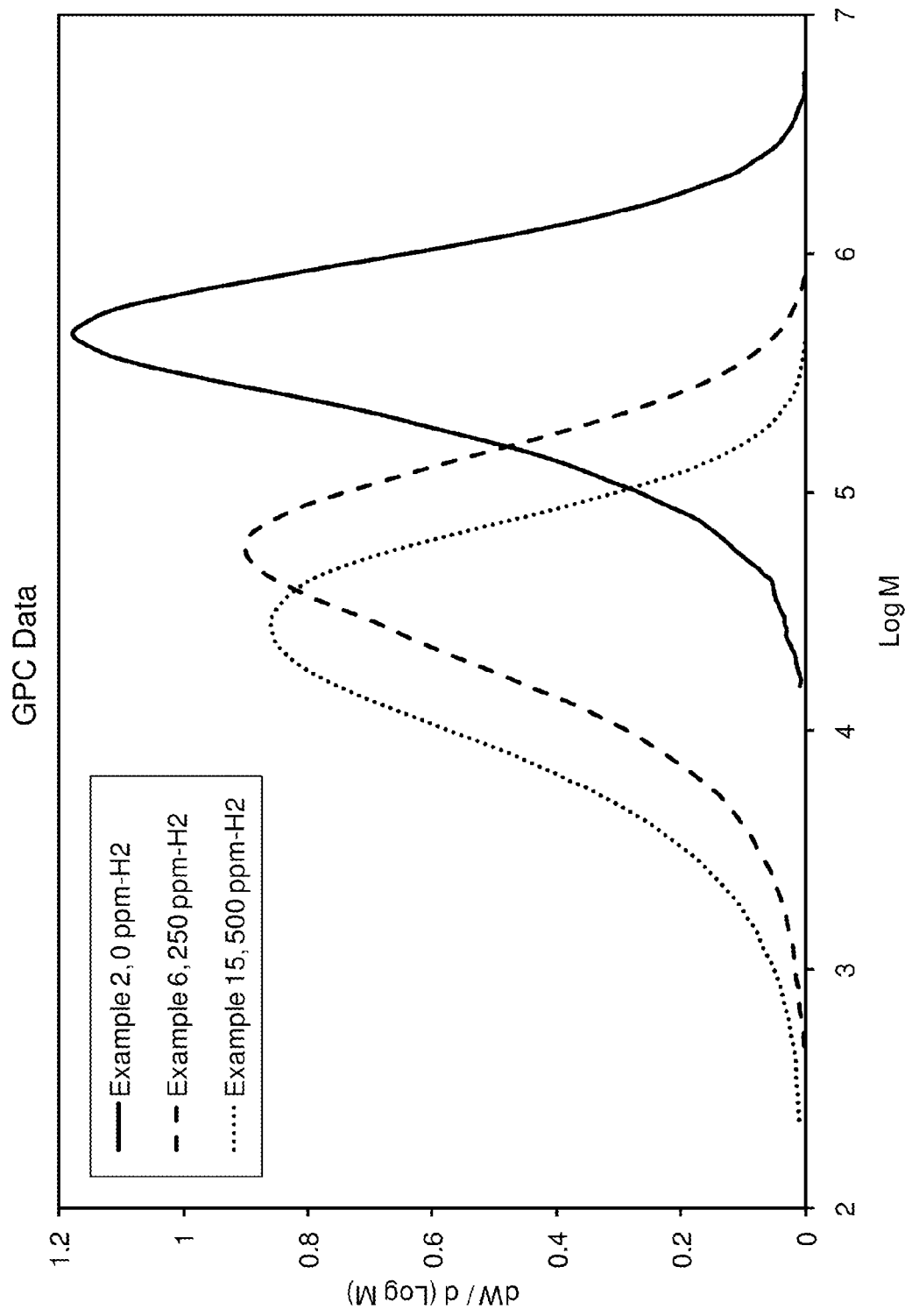
FIG. 2 presents a plot of the molecular weight distributions of the polymers of Examples 2, 6, and 15.

FIG. 2 illustrates the molecular weight distributions of the polymers of Examples 2, 6, and 15. For the homopolymers of these examples, FIG. 2 demonstrates that Mw decreased as the amount of added hydrogen increased.

Figure 3:
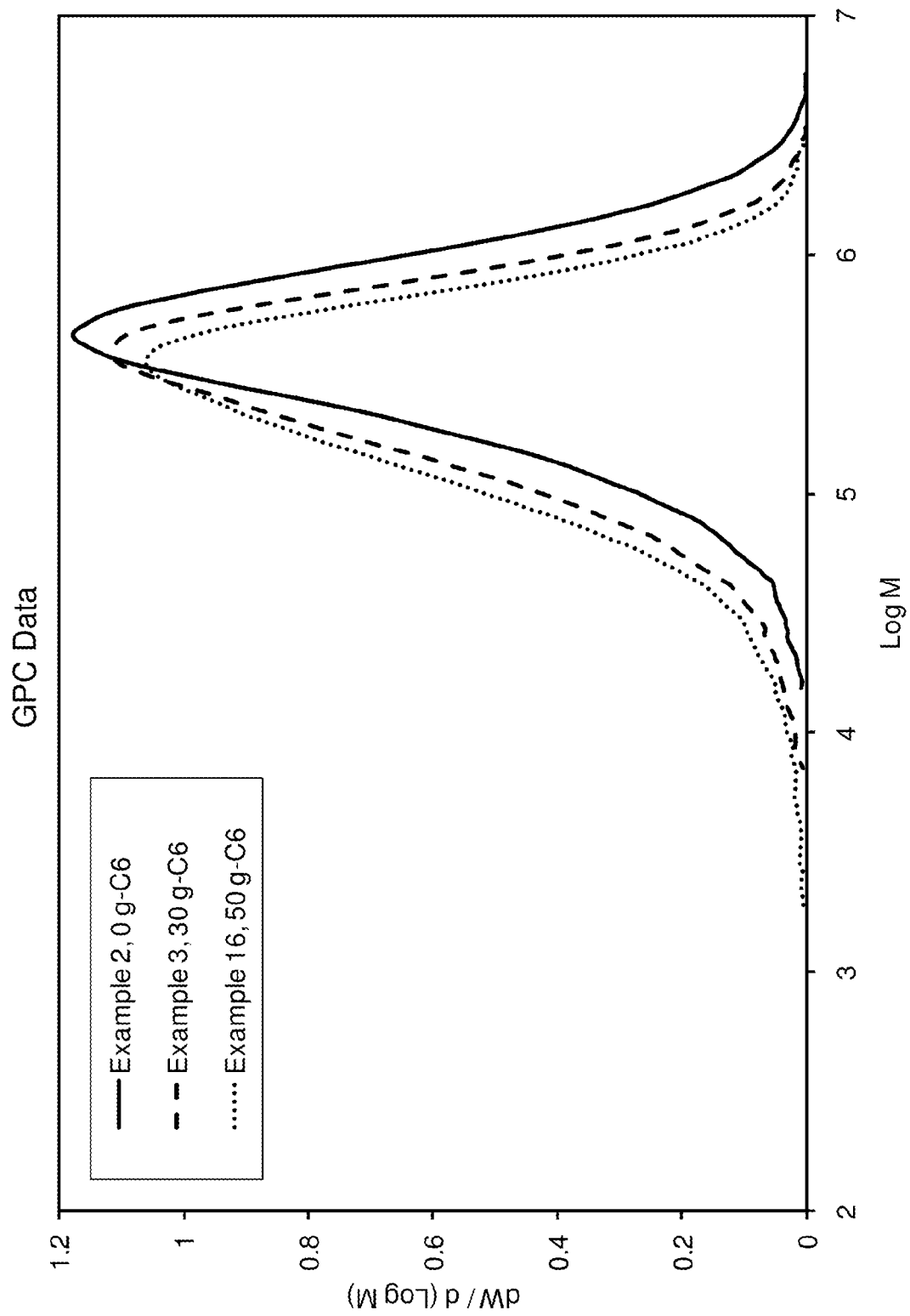
FIG. 3 presents a plot of the molecular weight distributions of the polymers of Examples 2, 3, and 16.

FIG. 3 illustrates the molecular weight distributions of the polymers of Examples 2-3 and 16. For the polymers of these examples, FIG. 3 demonstrates that Mw/Mn increased as comonomer content increased, in the absence of added hydrogen.

Figure 4:
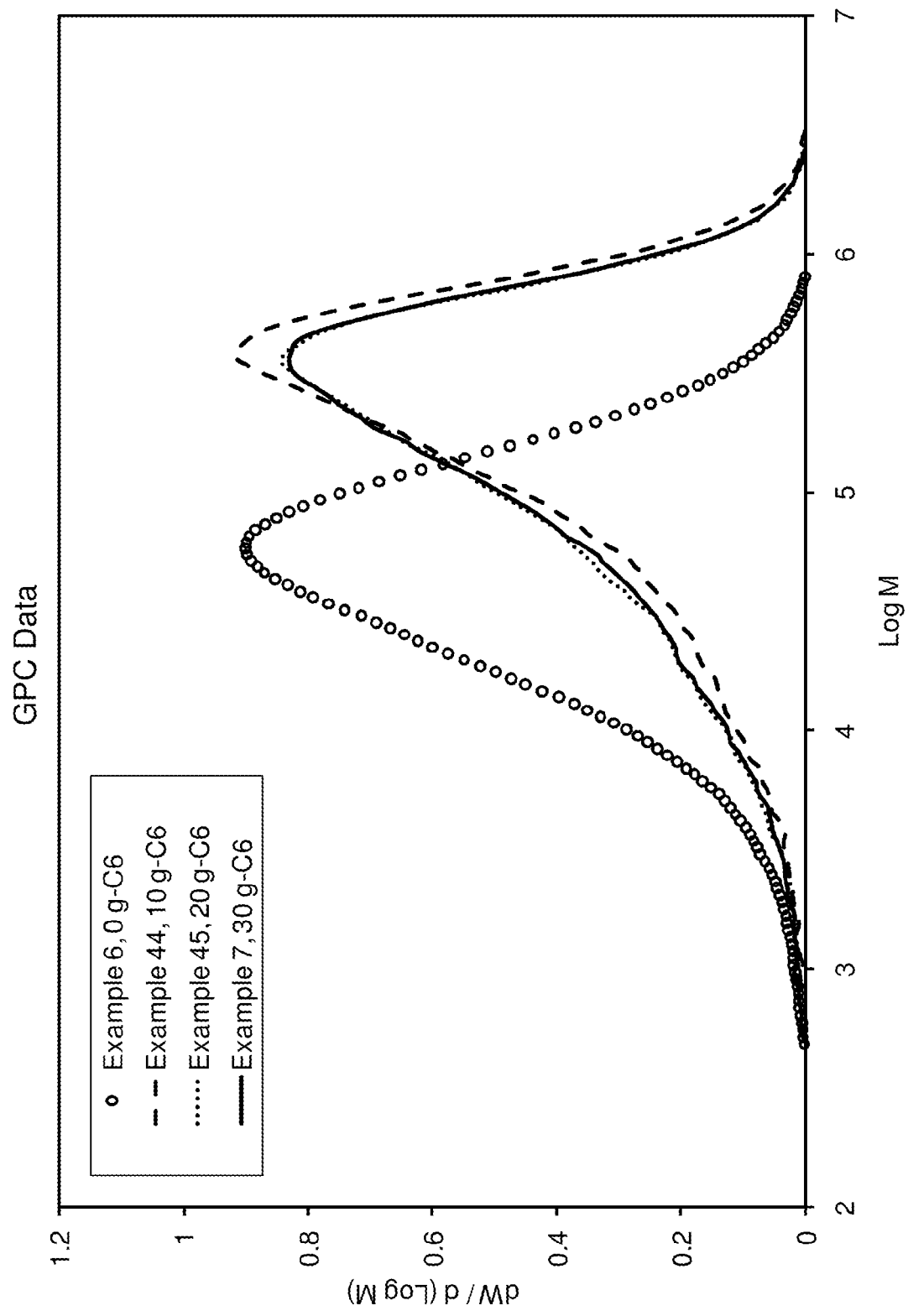
FIG. 4 presents a plot of the molecular weight distributions of the polymers of Examples 6-7 and 44-45.

FIG. 4 illustrates the molecular weight distributions of the polymers of Examples 6-7 and 44-45 at 250 ppm added hydrogen. FIG. 4 demonstrates that the Mw and the Mw/Mn of the copolymers were significantly greater than that of the homopolymer.

Figure 5:
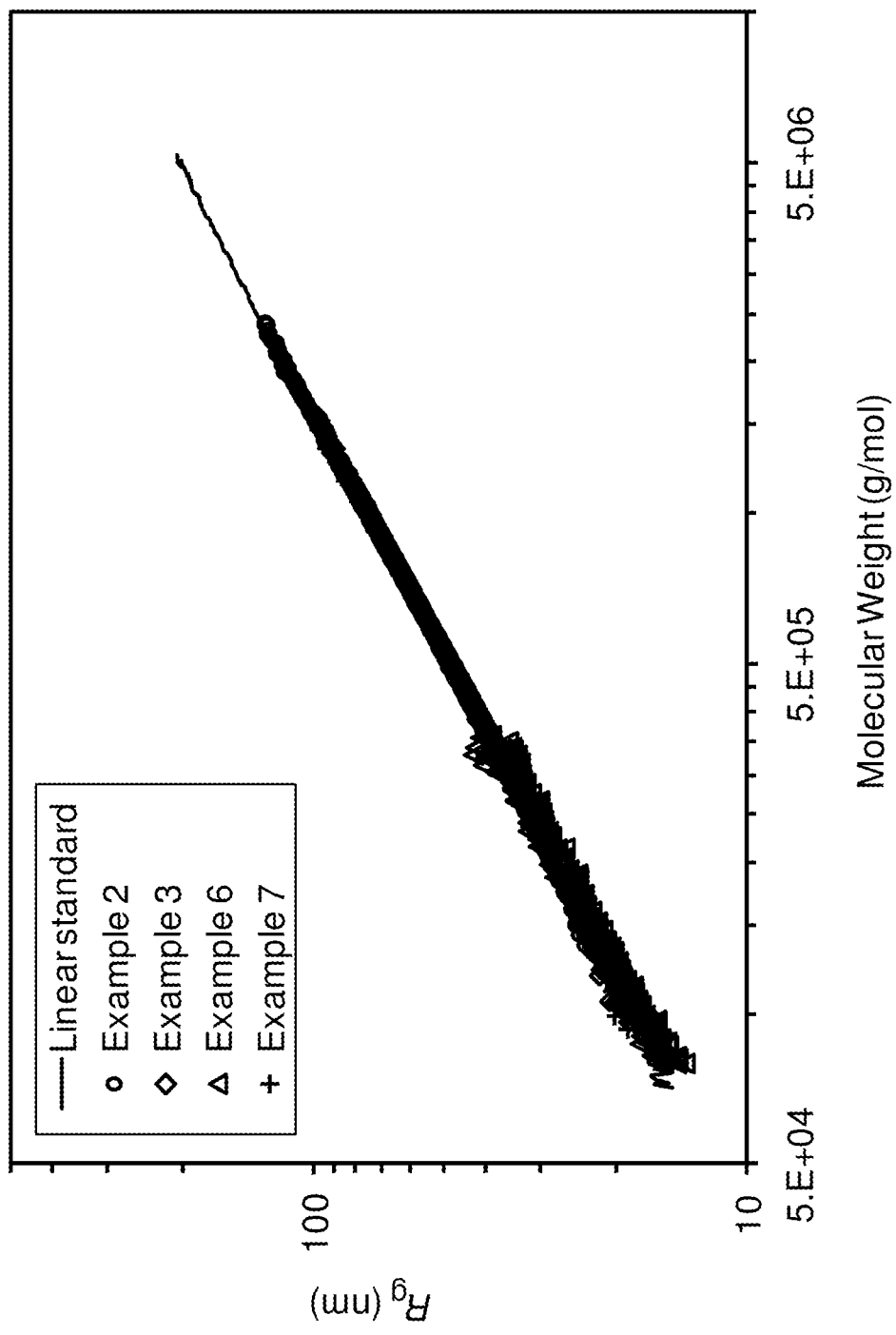
FIG. 5 presents a plot of the radius of gyration versus the logarithm of molecular weight for a linear standard and the polymers of Examples 2-3 and 6-7.

FIG. 5 illustrates the radius of gyration versus the logarithm of the molecular weight for a linear standard and the polymers of Examples 2-3 and 6-7, with data from SEC-MALS. FIG. 5 demonstrates these polymers were substantially linear polymers with minimal amounts of LCB's (long chain branches).

Figure 6:
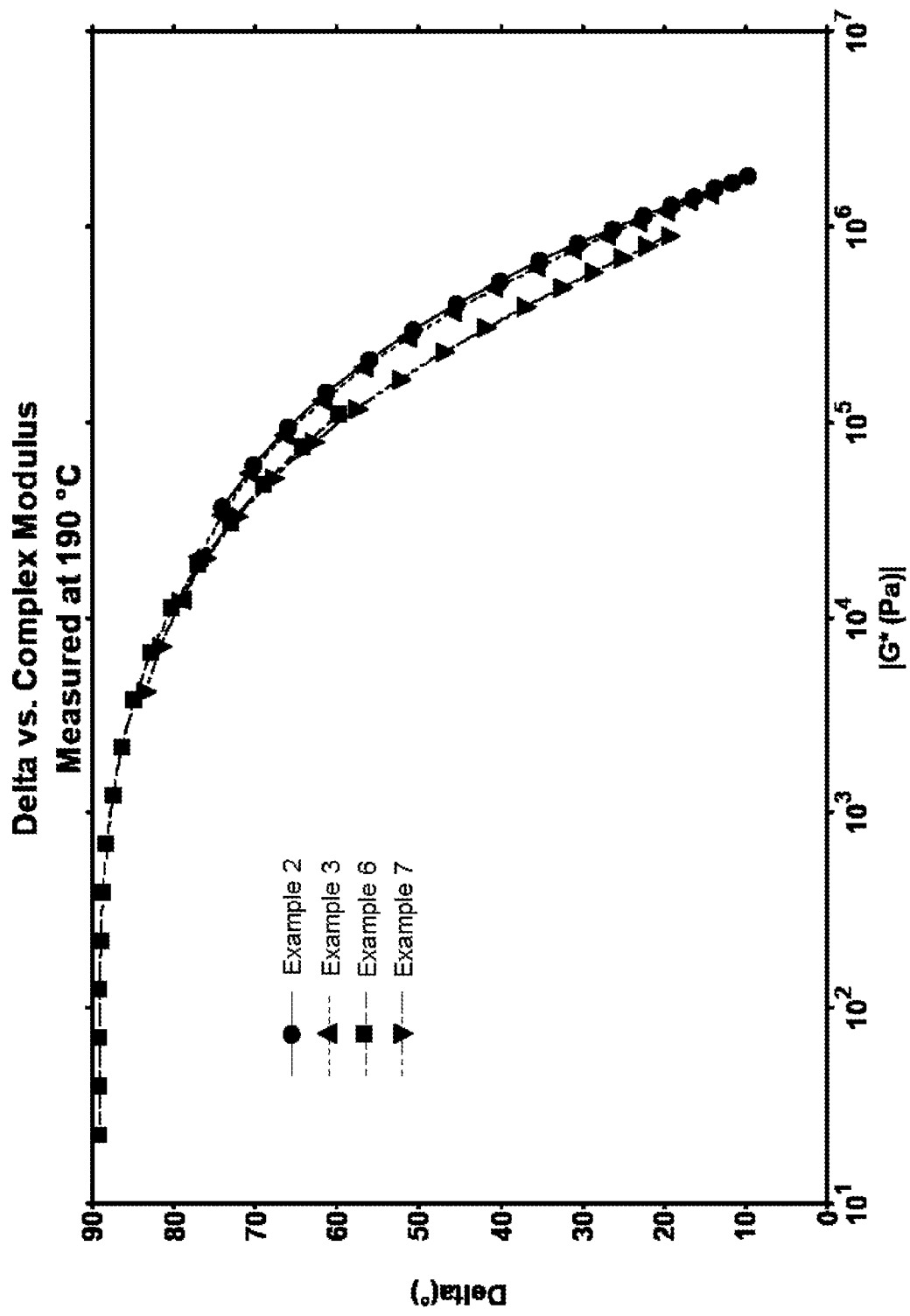
FIG. 6 presents a plot of Delta versus the log G* (complex modulus) for the polymers of Examples 2-3 and 6-7.

FIG. 6 illustrates the Delta versus the log G* (complex modulus) for the polymers of Examples 2-3 and 6-7. Similar to FIG. 5, the rheology data in FIG. 6 demonstrates that these polymers were substantially linear.

Figure 7:
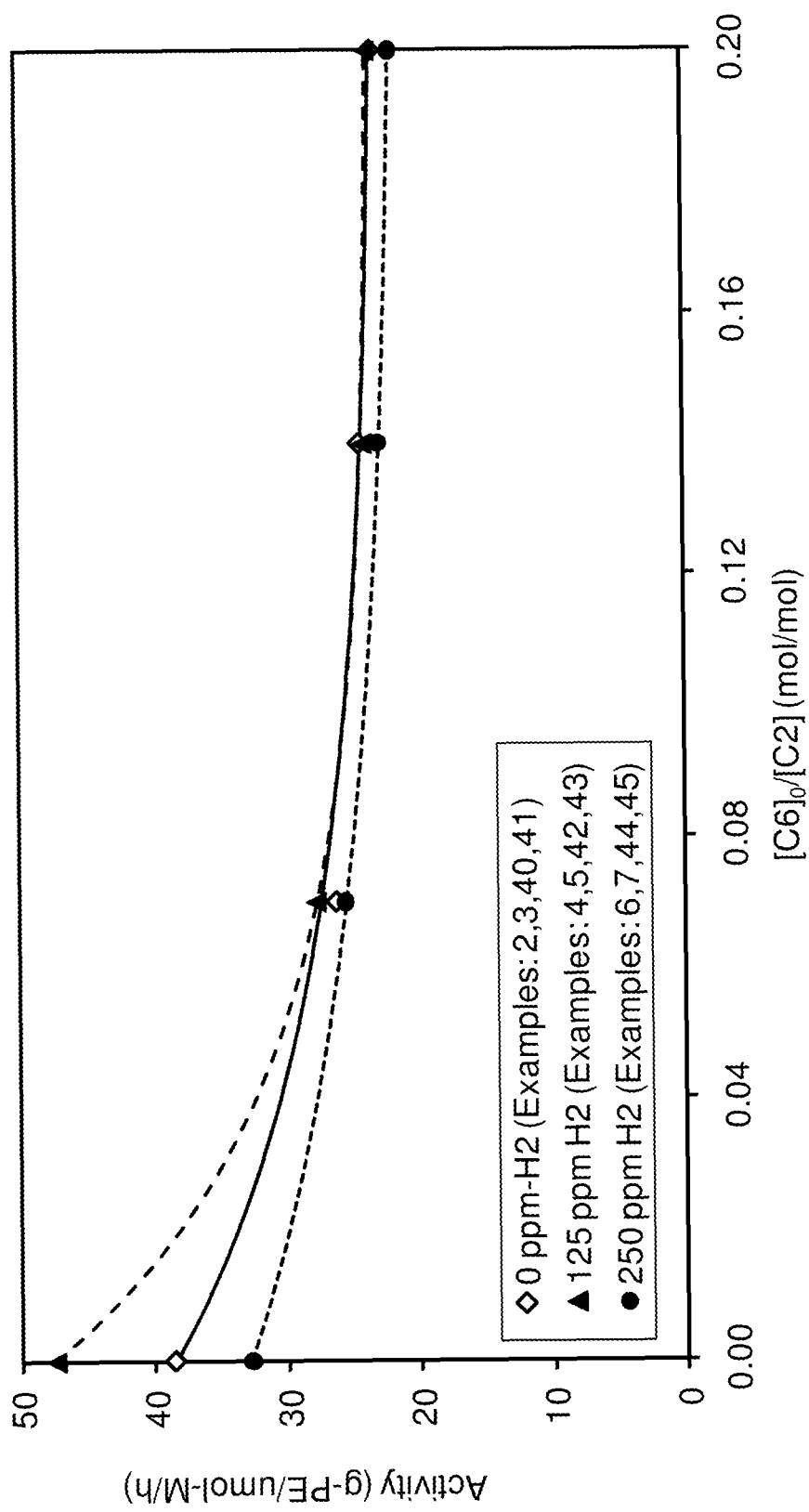
FIG. 7 presents a plot of catalyst activity versus initial 1-hexene comonomer concentration for Examples 2-7 and 40-45.

FIG. 7 illustrates the catalyst activity versus initial 1-hexene comonomer concentration for Examples 2-7 and 40-45 at varying amounts of added hydrogen. FIG. 7 demonstrates that the catalyst activities for these examples were substantially constant at a given comonomer concentration, even when hydrogen was added. Additionally, FIG. 7 demonstrates that the catalyst activity generally decreased as comonomer content increased.

Figure 8:
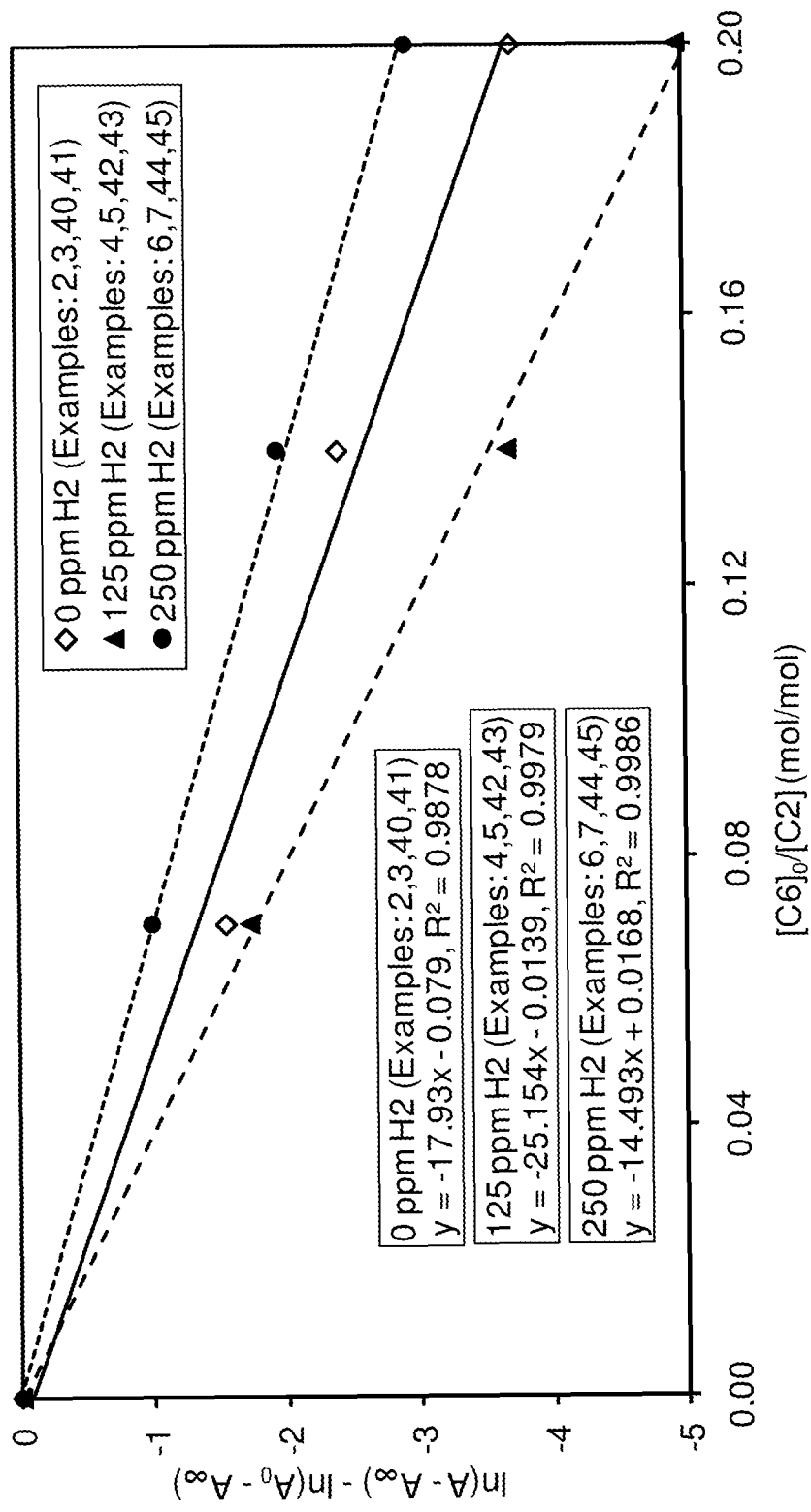
FIG. 8 presents a plot of first order models of catalyst activity versus initial 1-hexene comonomer concentration for Examples 2-7 and 40-45.

FIG. 8 illustrates plots of first order models of catalyst activity versus initial 1-hexene comonomer concentration for Examples 2-7 and 40-45. FIG. 8 demonstrates that the catalyst activities (abbreviated A) of these examples varied uniformly with comonomer concentration (1-hexene) at a given hydrogen content, following the first order exponential profile of (eq.1) below, where k is the slope.

$$\ln\left(\frac{A - A_\infty}{A_0 - A_\infty}\right) = -kC_{hexene} \qquad (eq. 1)$$

Figure 9:
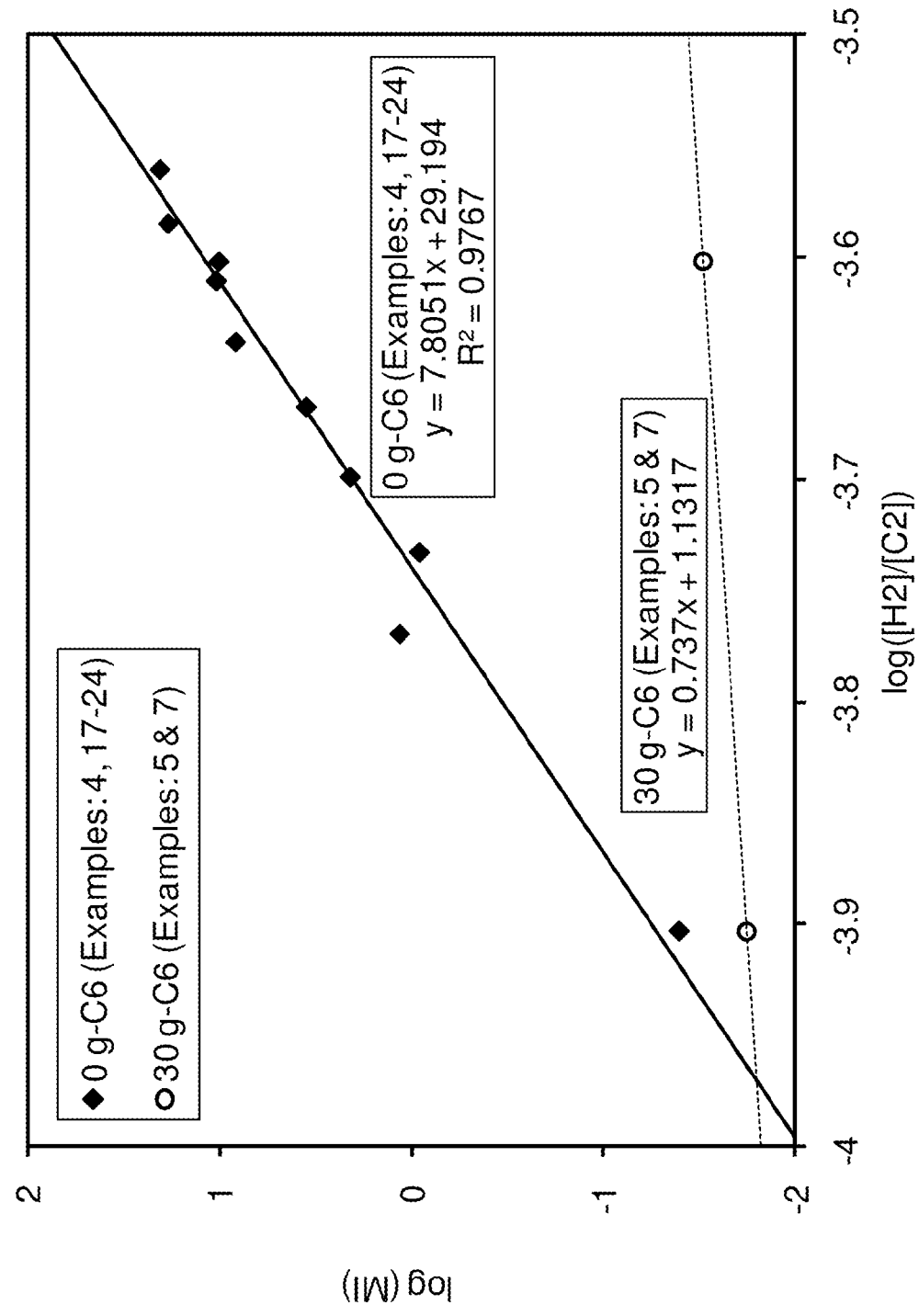
FIG. 9 presents a plot of the logarithm of melt index versus hydrogen feed concentration for the polymers of Examples 4-5, 7, and 17-24.

FIG. 9 illustrates plots of the logarithm of melt index versus the logarithm of the hydrogen feed concentration (hydrogen/ethylene) for the polymers of Examples 4-5, 7, and 17-24. FIG. 9 demonstrates the difference in hydrogen response when a copolymer was being produced as compared to when a homopolymer was being produced.

Figure 10:
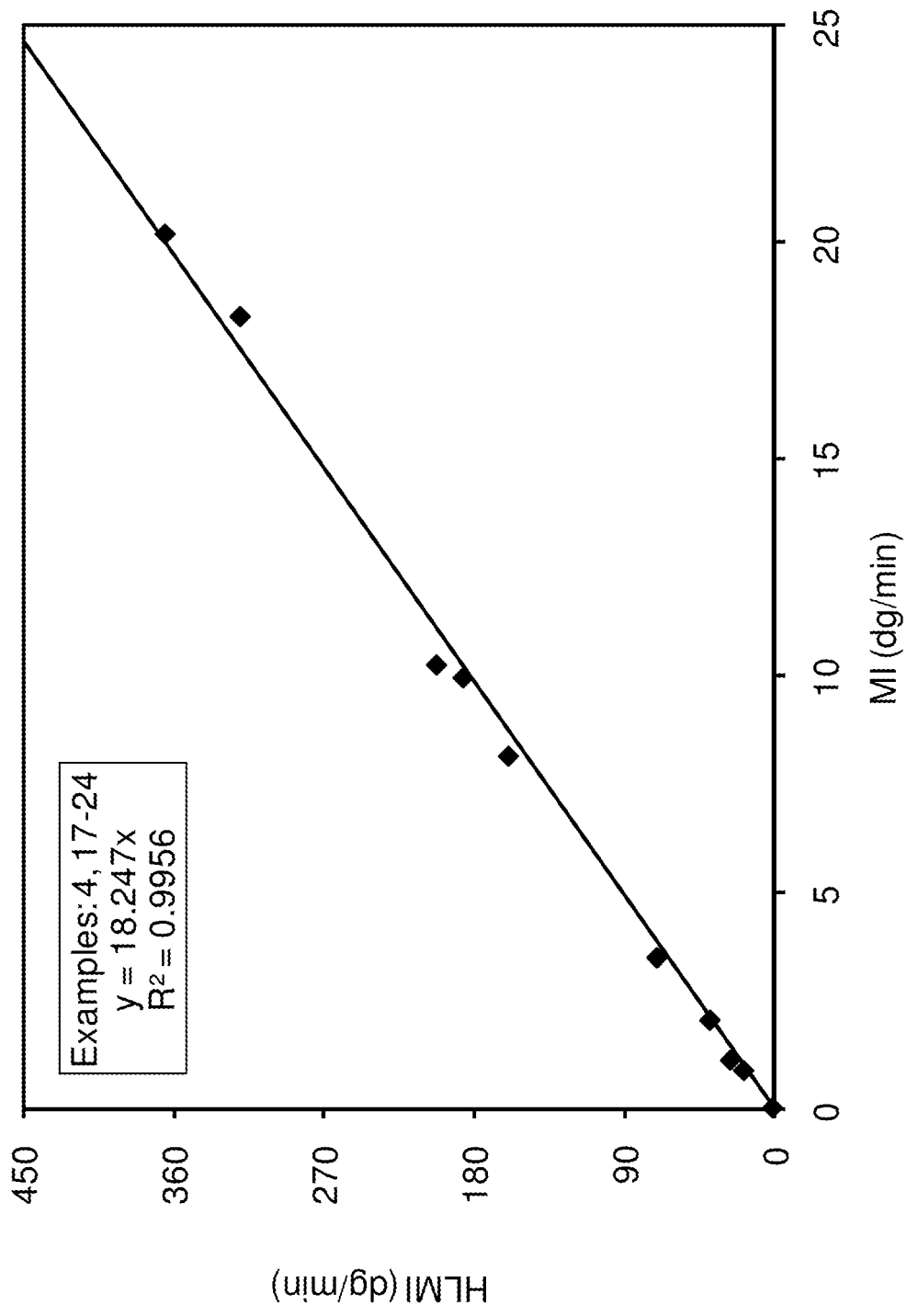
FIG. 10 presents a plot of the high load melt index versus the melt index for the polymers of Examples 4 and 17-24.

FIG. 10 illustrates a plot of the high load melt index versus the melt index for the polymers of Examples 4 and 17-24. FIG. 10 demonstrates that the shear rate ratio (HLMI/MI) was substantially constant across a range of hydrogen concentrations under homopolymer conditions.

Figure 11:
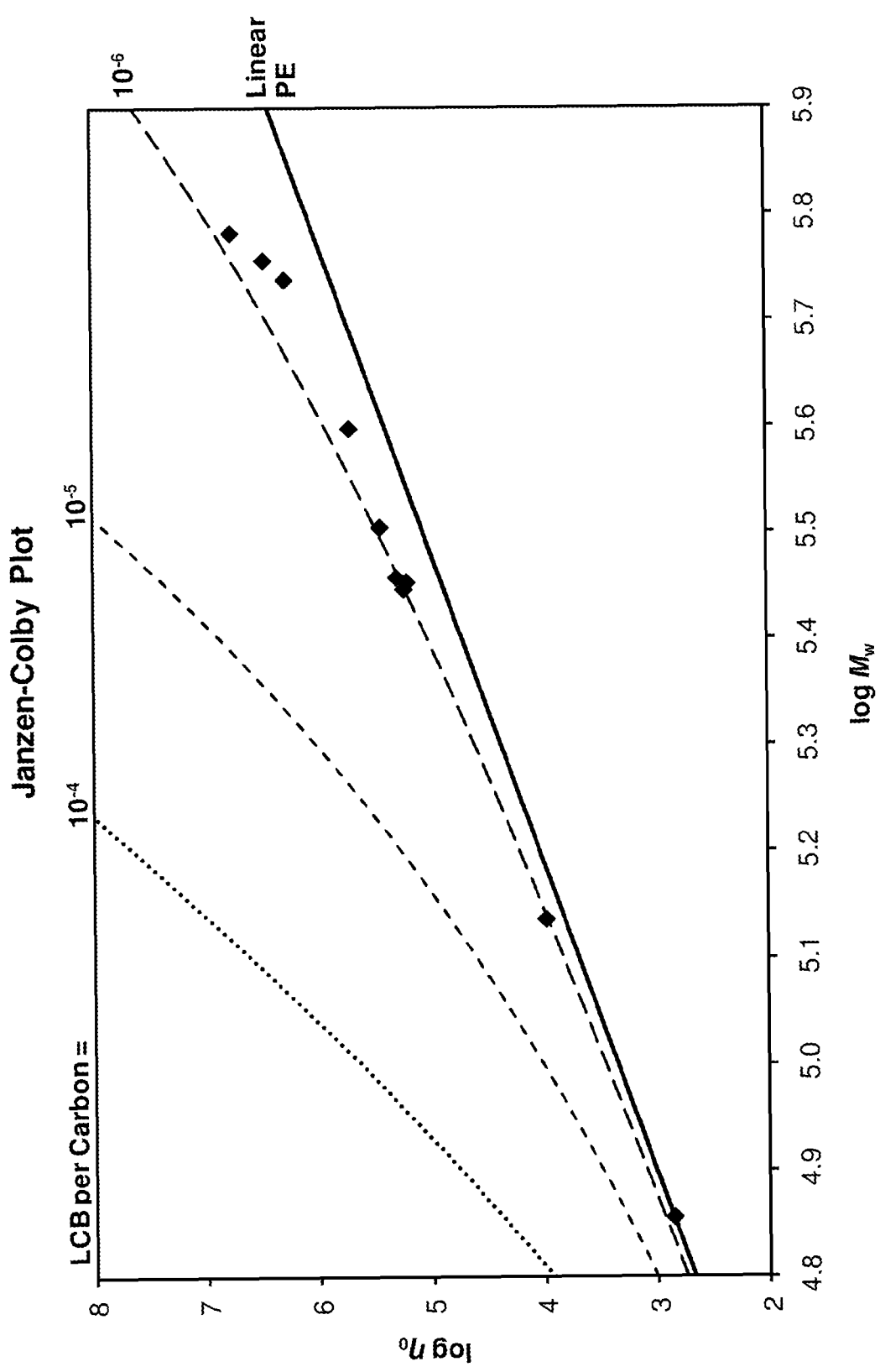
FIG. 11 presents a plot of zero shear viscosity versus weight-average molecular weight, specifically, $\log(\eta_0)$ versus $\log(Mw)$, for the polymers of Examples 2-3, 5-7, 18, 44-45, and 66-67.

FIG. 11 illustrates a plot of zero shear viscosity versus weight-average molecular weight, specifically, $\log(\eta_0)$ versus log(Mw), for the polymers of Examples 2-3, 5-7, 18, 44-45, and 66-67. FIG. 11 demonstrates the low levels of long chain branches (LCB's) attainable with this invention. Linear polyethylene polymers are observed to follow a power law relationship between their zero shear viscosity, $\eta_0$, and their weight-average molecular weight, Mw, with a power very close to 3.4. This relationship is shown by a straight line with a slope of 3.4 when the logarithm of $\eta_0$ is plotted versus the logarithm of Mw (labeled Linear PE in FIG. 11). Deviations from this linear polymer line are generally accepted as being caused by the presence of LCB's. Janzen and Colby presented a model that predicts the expected deviation from the linear plot of $\log(\eta_0)$ vs. log(Mw) for given amounts of LCB content as a function of the Mw of the polymer. See "Diagnosing long-chain branching in polyethylenes," *J. Mol. Struct.* 485-486, 569-584 (1999), which is incorporated herein by reference in its entirety. The polymers of Examples 2-3, 5-7, 18, 44-45, and 66-67 deviated only slightly from the well-known 3.4 power law "Arnett line" which is used as an indication of a linear polymer (J. Phys. Chem. 1980, 84, 649). All of these polymers had levels of LCB's at or below the line representing $1 \times 10^{-6}$ LCB's per carbon atom, which is equivalent to 0.001 LCB per 1000 total carbon atoms.

TABLE I

Polymerization Conditions and Polymer Properties for Examples 1-99.

| Example No | Catalyst Type | Catalyst Wt (mg) | Activator Type | Activator Wt (mg) | Co-catalyst Type | Temp (deg C.) | Reactor Pressure (psig) | H2 Feed in Ethylene (ppmw) | 1-hexene (g) | 1-hexene/ethylene (mol/mol) | PE Yield (g) | Catalyst Activity (g/μmol/h) | Activator Activity (g/g/hr) |
|---|---|---|---|---|---|---|---|---|---|---|---|---|---|
| 1 | MET1 | 3.4 | ACT1 | 200 | TIBA | 90 | 450 | 0 | 0 | 0.00 | 404 | 59.0 | 2020 |
| 2 | MET1 | 3.4 | ACT1 | 200 | TIBA | 90 | 390 | 0 | 0 | 0.00 | 264 | 38.6 | 1320 |
| 3 | MET1 | 3.4 | ACT1 | 200 | TIBA | 90 | 390 | 0 | 30 | 0.20 | 160 | 23.4 | 800 |
| 4 | MET1 | 3.4 | ACT1 | 200 | TIBA | 90 | 390 | 125 | 0 | 0.00 | 325 | 47.5 | 1625 |
| 5 | MET1 | 3.4 | ACT1 | 200 | TIBA | 90 | 390 | 125 | 30 | 0.20 | 162 | 23.7 | 810 |
| 6 | MET1 | 3.4 | ACT1 | 200 | TIBA | 90 | 390 | 250 | 0 | 0.00 | 224 | 32.7 | 1120 |
| 7 | MET1 | 3.4 | ACT1 | 200 | TIBA | 90 | 390 | 250 | 30 | 0.20 | 150 | 21.9 | 750 |
| 8 | MET1 | 3.4 | ACT1 | 200 | TIBA | 90 | 390 | 0 | 0 | 0.00 | 288 | 42.1 | 1440 |

TABLE I-continued

Polymerization Conditions and Polymer Properties for Examples 1-99.

| | | | | | | | | | | | | | |
|---|---|---|---|---|---|---|---|---|---|---|---|---|---|
| 9 | MET1 | 3.4 | ACT2 | 200 | TIBA | 90 | 390 | 0 | 0 | 0.00 | 17.4 | 2.5 | 87 |
| 10 | MET1 | 3.4 | ACT1 | 200 | TEA | 90 | 390 | 0 | 0 | 0.00 | 127 | 18.6 | 635 |
| 11 | MET1 | 1.7 | ACT1 | 200 | TIBA | 90 | 390 | 0 | 0 | 0.00 | 180 | 52.6 | 900 |
| 12 | MET1 | 1.7 | ACT1 | 100 | TIBA | 90 | 390 | 0 | 0 | 0.00 | 115 | 33.6 | 1150 |
| 13 | MET1 | 3.4 | ACT1 | 200 | TIBA | 85 | 362 | 0 | 0 | 0.00 | 260 | 38.0 | 1300 |
| 14 | MET1 | 3.4 | ACT1 | 200 | TIBA | 95 | 420 | 0 | 0 | 0.00 | 300 | 43.8 | 1500 |
| 15 | MET1 | 3.4 | ACT1 | 200 | TIBA | 90 | 390 | 500 | 0 | 0.00 | 130 | 19.0 | 650 |
| 16 | MET1 | 3.4 | ACT1 | 200 | TIBA | 90 | 390 | 0 | 50 | 0.32 | 137 | 20.0 | 685 |
| 17 | MET1 | 3.4 | ACT1 | 200 | TIBA | 90 | 390 | 170 | 0 | 0.00 | 297 | 43.4 | 1485 |
| 18 | MET1 | 3.4 | ACT1 | 200 | TIBA | 90 | 390 | 185 | 0 | 0.00 | 245 | 35.8 | 1225 |
| 19 | MET1 | 3.4 | ACT1 | 200 | TIBA | 90 | 390 | 200 | 0 | 0.00 | 205 | 30.0 | 1025 |
| 20 | MET1 | 3.4 | ACT1 | 200 | TIBA | 90 | 390 | 215 | 0 | 0.00 | 235 | 34.3 | 1175 |
| 21 | MET1 | 3.4 | ACT1 | 200 | TIBA | 90 | 390 | 230 | 0 | 0.00 | 195 | 28.5 | 975 |
| 22 | MET1 | 3.4 | ACT1 | 200 | TIBA | 90 | 390 | 245 | 0 | 0.00 | 200 | 29.2 | 1000 |
| 23 | MET1 | 3.4 | ACT1 | 200 | TIBA | 90 | 390 | 260 | 0 | 0.00 | 180 | 26.3 | 900 |
| 24 | MET1 | 3.4 | ACT1 | 200 | TIBA | 90 | 390 | 275 | 0 | 0.00 | 167 | 24.4 | 835 |
| 25 | MET1 | 3.4 | ACT1 | 200 | TIBA | 100 | 448 | 0 | 0 | 0.00 | 258 | 37.7 | 1290 |
| 26 | MET1 | 3.4 | ACT1 | 200 | TIBA | 80 | 335 | 0 | 0 | 0.00 | 240 | 35.1 | 1200 |
| 27 | MET1 | 3.4 | ACT1 | 200 | TIBA | 80 | 335 | 0 | 0 | 0.00 | 225 | 32.9 | 1125 |
| 28 | MET1 | 3.4 | ACT1 | 200 | TIBA | 90 | 390 | 60 | 0 | 0.00 | 205 | 30.0 | 1025 |
| 29 | MET1 | 3.4 | ACT1 | 200 | TIBA | 90 | 390 | 300 | 0 | 0.00 | 215 | 31.4 | 1075 |
| 30 | MET1 | 3.4 | ACT1 | 200 | TIBA | 90 | 390 | 0 | 10 | 0.07 | 185 | 27.0 | 925 |
| 31 | MET1 | 3.4 | ACT1 | 200 | TIBA | 90 | 390 | 0 | 20 | 0.14 | 160 | 23.4 | 800 |
| 32 | MET1 | 3.4 | ACT1 | 200 | TIBA | 90 | 390 | 125 | 10 | 0.07 | 180 | 26.3 | 900 |
| 33 | MET1 | 3.4 | ACT1 | 200 | TIBA | 80 | 335 | 185 | 0 | 0.00 | 268 | 39.2 | 1340 |
| 34 | MET1 | 3.4 | ACT1 | 200 | TIBA | 85 | 362 | 185 | 0 | 0.00 | 252 | 36.8 | 1260 |
| 35 | MET1 | 3.4 | ACT1 | 200 | TIBA | 90 | 390 | 185 | 0 | 0.00 | 257 | 37.5 | 1285 |
| 36 | MET1 | 3.4 | ACT1 | 200 | TIBA | 95 | 420 | 185 | 0 | 0.00 | 235 | 34.3 | 1175 |
| 37 | MET1 | 3.4 | ACT1 | 200 | TIBA | 100 | 448 | 185 | 0 | 0.00 | 170 | 24.8 | 850 |
| 38 | MET1 | 3.4 | ACT1 | 200 | TIBA | 90 | 390 | 60 | 0 | 0.00 | 235 | 34.3 | 1175 |
| 39 | MET1 | 3.4 | ACT1 | 200 | TIBA | 90 | 390 | 300 | 0 | 0.00 | 233 | 34.0 | 1165 |
| 40 | MET1 | 3.4 | ACT1 | 200 | TIBA | 90 | 390 | 0 | 10 | 0.07 | 180 | 26.3 | 900 |
| 41 | MET1 | 3.4 | ACT1 | 200 | TIBA | 90 | 390 | 0 | 20 | 0.14 | 167 | 24.4 | 835 |
| 42 | MET1 | 3.4 | ACT1 | 200 | TIBA | 90 | 390 | 125 | 10 | 0.07 | 190 | 27.8 | 950 |
| 43 | MET1 | 3.4 | ACT1 | 200 | TIBA | 90 | 390 | 125 | 20 | 0.14 | 165 | 24.1 | 825 |
| 44 | MET1 | 3.4 | ACT1 | 200 | TIBA | 90 | 390 | 250 | 10 | 0.07 | 175 | 25.6 | 875 |
| 45 | MET1 | 3.4 | ACT1 | 200 | TIBA | 90 | 390 | 250 | 20 | 0.14 | 157 | 22.9 | 785 |
| 46 | MET1 | 3.4 | ACT1 | 200 | TIBA | 90 | 390 | 185 | 10 | 0.07 | 155 | 22.6 | 775 |
| 47 | MET1 | 3.4 | ACT1 | 200 | TIBA | 90 | 390 | 185 | 20 | 0.14 | 160 | 23.4 | 800 |
| 48 | MET1 | 3.4 | ACT1 | 200 | TIBA | 90 | 390 | 185 | 30 | 0.20 | 142 | 20.7 | 710 |
| 49 | MET1 | 3.4 | ACT1 | 200 | TIBA | 90 | 390 | 250 | 10 | 0.07 | 175 | 25.6 | 875 |
| 50 | MET2 | 4.0 | ACT1 | 200 | TIBA | 90 | 450 | 0 | 0 | 0.00 | 342 | 49.1 | 1710 |
| 51 | MET2 | 4.0 | ACT1 | 200 | TIBA | 90 | 450 | 0 | 0 | 0.00 | 340 | 48.9 | 1700 |
| 52 | MET2 | 4.0 | ACT2 | 200 | TIBA | 90 | 450 | 0 | 0 | 0.00 | 32 | 4.6 | 160 |
| 53 | MET2 | 4.0 | ACT1 | 200 | TEA | 90 | 450 | 0 | 0 | 0.00 | 165 | 23.7 | 825 |
| 54 | MET2 | 4.0 | ACT1 | 200 | TIBA | 90 | 390 | 0 | 0 | 0.00 | 175 | 25.1 | 875 |
| 55 | MET2 | 4.0 | ACT1 | 200 | TIBA | 90 | 390 | 0 | 0 | 0.00 | 260 | 37.4 | 1300 |
| 56 | MET2 | 2.0 | ACT1 | 200 | TIBA | 90 | 390 | 0 | 0 | 0.00 | 185 | 53.2 | 925 |
| 57 | MET2 | 2.0 | ACT1 | 100 | TIBA | 90 | 390 | 0 | 0 | 0.00 | 125 | 35.9 | 1250 |
| 58 | MET2 | 4.0 | ACT3 | 200 | TIBA | 90 | 390 | 0 | 0 | 0.00 | 330 | 47.4 | 1650 |
| 59 | MET2 | 2.0 | ACT3 | 200 | TIBA | 90 | 390 | 0 | 0 | 0.00 | 330 | 94.9 | 1650 |
| 60 | MET2 | 1.0 | ACT3 | 200 | TIBA | 90 | 390 | 0 | 0 | 0.00 | 280 | 161.0 | 1400 |
| 61 | MET2 | 0.5 | ACT3 | 200 | TIBA | 90 | 390 | 0 | 0 | 0.00 | 180 | 206.9 | 900 |
| 62 | MET2 | 1.0 | ACT3 | 200 | TIBA | 90 | 390 | 300 | 0 | 0.00 | 242 | 139.1 | 1210 |
| 63 | MET1 | 4.0 | ACT3 | 200 | TIBA | 90 | 390 | 0 | 0 | 0.00 | 420 | 52.2 | 2100 |
| 64 | MET1 | 2.0 | ACT3 | 200 | TIBA | 90 | 390 | 0 | 0 | 0.00 | 240 | 59.6 | 1200 |
| 65 | MET1 | 1.0 | ACT3 | 200 | TIBA | 90 | 390 | 0 | 0 | 0.00 | 200 | 99.3 | 1000 |
| 66 | MET1 | 0.5 | ACT3 | 200 | TIBA | 90 | 390 | 0 | 0 | 0.00 | 140 | 139.1 | 700 |
| 67 | MET1 | 0.5 | ACT3 | 200 | TIBA | 90 | 390 | 190 | 0 | 0.00 | 215 | 213.6 | 1075 |
| 68 | MET1 | 0.5 | ACT3 | 200 | TIBA | 80 | 335 | 0 | 0 | 0.00 | 215 | 213.6 | 1075 |
| 69 | MET1 | 0.5 | ACT3 | 200 | TIBA | 85 | 362 | 0 | 0 | 0.00 | 180 | 178.8 | 900 |
| 70 | MET1 | 0.5 | ACT3 | 200 | TIBA | 90 | 390 | 0 | 0 | 0.00 | 195 | 193.7 | 975 |
| 71 | MET1 | 0.5 | ACT3 | 200 | TIBA | 95 | 420 | 0 | 0 | 0.00 | 225 | 223.5 | 1125 |
| 72 | MET1 | 0.5 | ACT3 | 200 | TIBA | 100 | 448 | 0 | 0 | 0.00 | 210 | 208.6 | 1050 |
| 73 | MET2 | 1.0 | ACT3 | 200 | TIBA | 90 | 390 | 300 | 0 | 0.00 | 240 | 138.0 | 1200 |
| 74 | MET2 | 1.0 | ACT3 | 200 | TIBA | 90 | 390 | 325 | 0 | 0.00 | 176 | 101.2 | 880 |
| 75 | MET2 | 1.0 | ACT3 | 200 | TIBA | 90 | 390 | 350 | 0 | 0.00 | 182 | 104.6 | 910 |
| 76 | MET2 | 1.0 | ACT3 | 200 | TIBA | 90 | 390 | 375 | 0 | 0.00 | 170 | 97.7 | 850 |
| 77 | MET2 | 1.0 | ACT3 | 200 | TIBA | 90 | 390 | 400 | 0 | 0.00 | 154 | 88.5 | 770 |
| 78 | MET2 | 1.0 | ACT3 | 200 | TIBA | 90 | 390 | 300 | 10 | 0.07 | 235 | 135.1 | 1175 |
| 79 | MET2 | 1.0 | ACT3 | 200 | TIBA | 90 | 390 | 325 | 10 | 0.07 | 180 | 103.5 | 900 |
| 80 | MET2 | 1.0 | ACT3 | 200 | TIBA | 90 | 390 | 350 | 10 | 0.07 | 185 | 106.3 | 925 |
| 81 | MET2 | 1.0 | ACT3 | 200 | TIBA | 90 | 390 | 375 | 10 | 0.07 | 150 | 86.2 | 750 |
| 82 | MET2 | 1.0 | ACT3 | 200 | TIBA | 90 | 390 | 400 | 10 | 0.07 | 176 | 101.2 | 880 |
| 83 | MET1 | 3.4 | ACT1 | 200 | TIBA | 90 | 390 | 185 | 0 | 0.00 | 312 | 45.6 | 1560 |
| 84 | MET1 | 3.4 | ACT1 | 200 | TIBA | 90 | 390 | 190 | 0 | 0.00 | 272 | 39.7 | 1360 |
| 85 | MET1 | 3.4 | ACT1 | 200 | TIBA | 90 | 390 | 190 | 0 | 0.00 | 214 | 31.3 | 1070 |
| 86 | MET3 | 1.7 | ACT1 | 200 | TIBA | 90 | 390 | 0 | 0 | 0.00 | 150 | 44.7 | 750 |

TABLE I-continued

Polymerization Conditions and Polymer Properties for Examples 1-99.

| | | | | | | | | | | | | | |
|---|---|---|---|---|---|---|---|---|---|---|---|---|---|
| 87 | MET1 | 3.4 | ACT1 | 200 | TIBA | 90 | 390 | 190 | 0 | 0.00 | 260 | 38.0 | 1300 |
| 88 | MET3 | 1.7 | ACT1 | 200 | TIBA | 90 | 390 | 100 | 0 | 0.00 | 191 | 56.9 | 955 |
| 89 | MET3 | 1.7 | ACT1 | 200 | TIBA | 90 | 390 | 250 | 0 | 0.00 | 235 | 70.0 | 1175 |
| 90 | MET3 | 1.7 | ACT1 | 200 | TIBA | 90 | 390 | 500 | 0 | 0.00 | 100 | 29.8 | 500 |
| 91 | MET3 | 1.7 | ACT1 | 200 | TIBA | 90 | 390 | 100 | 30 | 0.20 | 120 | 35.8 | 600 |
| 92 | MET3 | 1.7 | ACT1 | 200 | TIBA | 90 | 390 | 250 | 30 | 0.20 | 180 | 53.7 | 900 |
| 93 | MET3 | 1.7 | ACT1 | 200 | TIBA | 90 | 390 | 500 | 30 | 0.20 | 192 | 57.2 | 960 |
| 94 | MET3 | 1.7 | ACT1 | 200 | TIBA | 90 | 390 | 500 | 30 | 0.21 | 291 | 86.9 | 1455 |
| 95 | MET3 | 1.7 | ACT1 | 200 | TIBA | 90 | 390 | 500 | 0 | 0.00 | 155 | 46.3 | 775 |
| 96 | MET3 | 1.7 | ACT1 | 200 | TIBA | 90 | 390 | 0 | 0 | 0.00 | 230 | 68.7 | 1150 |
| 97 | MET3 | 1.7 | ACT1 | 200 | TIBA | 90 | 390 | 0 | 0 | 0.00 | 166 | 49.6 | 830 |
| 98 | MET3 | 1.7 | ACT1 | 200 | TIBA | 90 | 390 | 250 | 10 | 0.07 | 412 | 123.0 | 2060 |
| 99 | MET3 | 1.7 | ACT4 | 200 | TIBA | 90 | 390 | 250 | 10 | 0.07 | 176 | 52.5 | 880 |

| Example No | MI (g/10 min) | HLMI (g/10 min) | HLMI/MI | Density (g/cc) | Mn (kg/mol) | Mw (kg/mol) | Mz (kg/mol) | Mw/Mn | Mz/Mw | $\eta_o$ | $\tau_\eta$ | a | SCB/1000 Carbons |
|---|---|---|---|---|---|---|---|---|---|---|---|---|---|
| 1 | 0.000 | 0.000 | — | — | 192.9 | 462.7 | 978.5 | 2.40 | 2.11 | — | — | — | — |
| 2 | 0.000 | 0.000 | — | 0.9378 | 257.6 | 547.2 | 959.9 | 2.12 | 1.75 | 1883000 | 0.8807 | 0.4268 | 0.86 |
| 3 | 0.000 | 0.222 | — | 0.9269 | 162.9 | 396.0 | 676.4 | 2.43 | 1.71 | 505800 | 0.2626 | 0.4394 | 2.95 |
| 4 | 0.040 | 1.310 | 32.75 | — | — | — | — | — | — | — | — | — | — |
| 5 | 0.018 | 0.730 | 40.56 | — | 45.1 | 286.7 | 567.8 | 6.35 | 1.98 | 197300 | 0.1485 | 0.4469 | — |
| 6 | 9.960 | 186.600 | 18.73 | 0.9671 | 20.1 | 71.6 | 153.7 | 3.56 | 2.15 | 720 | 0.0014 | 0.6335 | 0.83 |
| 7 | 0.030 | 0.950 | 31.67 | 0.9354 | 37.0 | 283.9 | 582.3 | 7.67 | 2.05 | 159900 | 0.1264 | 0.4486 | 2.38 |
| 8 | 0.000 | 0.050 | — | — | 245.7 | 543.2 | 943.2 | 2.21 | 1.74 | — | — | — | — |
| 9 | 0.000 | 0.054 | — | — | 214.7 | 586.8 | 1219.1 | 2.73 | 2.08 | — | — | — | — |
| 10 | 0.000 | 0.069 | — | — | — | — | — | — | — | — | — | — | — |
| 11 | 0.000 | 0.030 | — | — | — | — | — | — | — | — | — | — | — |
| 12 | 0.000 | 0.030 | — | — | — | — | — | — | — | — | — | — | — |
| 13 | 0.000 | 0.040 | — | — | — | — | — | — | — | — | — | — | — |
| 14 | 0.000 | 0.067 | — | — | 234.7 | 503.7 | 847.1 | 2.15 | 1.68 | — | — | — | — |
| 15 | 148.500 | 836.000 | 5.63 | — | 8.8 | 33.1 | 70.1 | 3.74 | 2.12 | — | — | — | — |
| 16 | 0.017 | 0.346 | 20.35 | — | 108.8 | 337.9 | 598.9 | 3.11 | 1.77 | — | — | — | — |
| 17 | 1.140 | 26.400 | 23.16 | — | — | — | — | — | — | — | — | — | — |
| 18 | 0.900 | 18.600 | 20.67 | — | 26.8 | 136.7 | 330.7 | 5.10 | 2.42 | 9567 | 0.0210 | 0.5045 | — |
| 19 | 2.060 | 38.800 | 18.83 | — | — | — | — | — | — | — | — | — | — |
| 20 | 3.500 | 70.400 | 20.11 | — | — | — | — | — | — | — | — | — | — |
| 21 | 8.150 | 159.400 | 19.56 | — | — | — | — | — | — | — | — | — | — |
| 22 | 10.300 | 202.600 | 19.67 | — | — | — | — | — | — | — | — | — | — |
| 23 | 18.300 | 320.000 | 17.49 | — | — | — | — | — | — | — | — | — | — |
| 24 | 20.100 | 364.000 | 18.11 | — | — | — | — | — | — | — | — | — | — |
| 25 | 0.000 | 0.140 | — | — | — | — | — | — | — | — | — | — | — |
| 26 | 0.000 | 0.000 | — | — | — | — | — | — | — | — | — | — | — |
| 27 | 4.020 | 90.700 | 22.56 | — | — | — | — | — | — | — | — | — | — |
| 28 | 0.000 | 0.000 | — | — | — | — | — | — | — | — | — | — | — |
| 29 | 0.000 | 0.000 | — | — | — | — | — | — | — | — | — | — | — |
| 30 | 0.000 | 0.000 | — | — | — | — | — | — | — | — | — | — | — |
| 31 | 0.000 | 0.000 | — | — | — | — | — | — | — | — | — | — | — |
| 32 | 0.000 | 0.000 | — | — | — | — | — | — | — | — | — | — | — |
| 33 | 0.710 | 17.300 | 24.37 | — | — | — | — | — | — | — | — | — | — |
| 34 | 0.840 | 20.600 | 24.52 | — | — | — | — | — | — | — | — | — | — |
| 35 | 0.960 | 21.700 | 22.60 | — | — | — | — | — | — | — | — | — | — |
| 36 | 0.400 | 9.030 | 22.58 | — | — | — | — | — | — | — | — | — | — |
| 37 | 0.053 | 1.640 | 30.94 | — | — | — | — | — | — | — | — | — | — |
| 38 | 0.000 | 0.220 | 22000.00 | — | — | — | — | — | — | — | — | — | — |
| 39 | 13.100 | 46.700 | 3.56 | — | — | — | — | — | — | — | — | — | — |
| 40 | 0.000 | 0.120 | 12000.00 | — | — | — | — | — | — | — | — | — | — |
| 41 | 0.000 | 0 | 18000.00 | — | — | — | — | — | — | — | — | — | — |
| 42 | 0.000 | 0.310 | 31000.00 | — | — | — | — | — | — | — | — | — | — |
| 43 | 0.012 | 0.730 | 60.83 | — | — | — | — | — | — | — | — | — | — |
| 44 | 0.005 | 0.490 | 98.00 | — | 49.1 | 319.6 | 632.7 | 6.51 | 1.98 | 274500 | 0.1960 | 0.4470 | — |
| 45 | 0.029 | 0.930 | 32.07 | — | 42.7 | 279.5 | 577.8 | 6.54 | 2.07 | 169700 | 0.1383 | 0.4478 | — |
| 46 | 0.022 | 0.790 | 35.91 | — | — | — | — | — | — | — | — | — | — |
| 47 | 0.000 | 0.000 | — | — | — | — | — | — | — | — | — | — | — |
| 48 | 0.000 | 0.000 | — | — | — | — | — | — | — | — | — | — | — |
| 49 | 0.000 | 0.000 | — | — | — | — | — | — | — | — | — | — | — |
| 50 | 0.000 | 0.000 | — | — | — | — | — | — | — | — | — | — | — |
| 51 | 0.000 | 0.000 | — | — | — | — | — | — | — | — | — | — | — |
| 52 | 0.000 | 0.000 | — | — | — | — | — | — | — | — | — | — | — |
| 53 | 0.000 | 0.000 | — | — | — | — | — | — | — | — | — | — | — |
| 54 | 0.000 | 0.000 | — | — | — | — | — | — | — | — | — | — | — |
| 55 | 0.000 | 0.000 | — | — | — | — | — | — | — | — | — | — | — |
| 56 | 0.000 | 0.000 | — | — | — | — | — | — | — | — | — | — | — |
| 57 | 0.000 | 0.000 | — | — | — | — | — | — | — | — | — | — | — |
| 58 | 0.000 | 0.000 | — | — | — | — | — | — | — | — | — | — | — |
| 59 | 0.000 | 0.000 | — | — | — | — | — | — | — | — | — | — | — |
| 60 | 0.000 | 0.000 | — | — | — | — | — | — | — | — | — | — | — |

TABLE I-continued

Polymerization Conditions and Polymer Properties for Examples 1-99.

| | | | | | | | | | | | | | |
|---|---|---|---|---|---|---|---|---|---|---|---|---|---|
| 61 | 0.000 | 0.000 | — | — | — | — | — | — | — | — | — | — | — |
| 62 | 0.630 | 30.500 | 48.41 | — | 23.0 | 146.8 | 1569.8 | 6.39 | 10.70 | 2694000 | 0.0000008 | 0.0564 | — |
| 63 | 0.000 | 0.170 | — | — | — | — | — | — | — | — | — | — | — |
| 64 | 0.000 | 0.520 | — | — | — | — | — | — | — | — | — | — | — |
| 65 | 0.000 | 0.000 | — | — | — | — | — | — | — | — | — | — | — |
| 66 | 0.000 | 0.000 | — | — | 266.1 | 605.2 | 1368.9 | 2.27 | 2.26 | 5674000 | 2.5790 | 0.3349 | — |
| 67 | 0.000 | 0.042 | — | — | 216.6 | 570.5 | 1433.3 | 2.63 | 2.51 | 2877000 | 1.4030 | 0.3856 | — |
| 68 | 0.000 | 0.000 | — | — | — | — | — | — | — | — | — | — | — |
| 69 | 0.000 | 0.000 | — | — | — | — | — | — | — | — | — | — | — |
| 70 | 0.000 | 0.000 | — | — | — | — | — | — | — | — | — | — | — |
| 71 | 0.000 | 0.000 | — | — | — | — | — | — | — | — | — | — | — |
| 72 | 0.000 | 0.000 | — | — | — | — | — | — | — | — | — | — | — |
| 73 | 0.042 | 6.600 | 157.14 | — | — | — | — | — | — | — | — | — | — |
| 74 | 0.054 | 33.500 | 620.37 | — | — | — | — | — | — | — | — | — | — |
| 75 | 0.640 | 53.500 | 83.59 | — | — | — | — | — | — | — | — | — | — |
| 76 | 0.790 | 50.700 | 64.18 | — | — | — | — | — | — | — | — | — | — |
| 77 | 0.620 | 56.000 | 90.32 | — | — | — | — | — | — | — | — | — | — |
| 78 | 0.018 | 0.910 | 50.56 | — | — | — | — | — | — | — | — | — | — |
| 79 | 0.000 | 0.000 | — | — | — | — | — | — | — | — | — | — | — |
| 80 | 0.000 | 0.000 | — | — | — | — | — | — | — | — | — | — | — |
| 81 | 0.000 | 0.000 | — | — | — | — | — | — | — | — | — | — | — |
| 82 | 0.000 | 0.000 | — | — | — | — | — | — | — | — | — | — | — |
| 83 | 0.270 | 8.170 | 30.26 | — | — | — | — | — | — | — | — | — | — |
| 84 | 0.025 | 0.980 | 39.68 | — | — | — | — | — | — | — | — | — | — |
| 85 | 0.000 | 0.165 | 1650.00 | — | — | — | — | — | — | — | — | — | — |
| 86 | 0.107 | 3.640 | 34.02 | — | 22.4 | 211.7 | 587.4 | 9.45 | 2.78 | — | — | — | — |
| 87 | 0.660 | 17.700 | 26.82 | — | — | — | — | — | — | — | — | — | — |
| 88 | 0.079 | 2.610 | 33.04 | — | 40.2 | 225.9 | 568.0 | 5.62 | 2.51 | — | — | — | — |
| 89 | 2.830 | 78.050 | 27.58 | — | 15.5 | 99.0 | 291.3 | 6.37 | 2.94 | — | — | — | — |
| 90 | 35.300 | 833.000 | 23.60 | — | 6.7 | 48.7 | 157.2 | 7.26 | 3.22 | — | — | — | — |
| 91 | 0.280 | 7.780 | 27.79 | — | 19.1 | 171.6 | 430.4 | 8.96 | 2.51 | — | — | — | — |
| 92 | 0.335 | 9.380 | 28.00 | — | 29.3 | 162.6 | 418.7 | 5.56 | 2.57 | — | — | — | — |
| 93 | 0.870 | 22.900 | 26.32 | — | 21.3 | 129.8 | 342.1 | 6.08 | 2.64 | — | — | — | — |
| 94 | 5.910 | 191.0 | 32.31 | — | 11.4 | 80.0 | 256.7 | 6.99 | 3.21 | — | — | — | — |
| 95 | 39.600 | 833.0 | 21.04 | — | 7.7 | 48.9 | 158.2 | 6.40 | 3.23 | — | — | — | — |
| 96 | 0.064 | 2.9 | 45.94 | — | 33.0 | 235.2 | 603.6 | 7.13 | 2.57 | — | — | — | — |
| 97 | — | — | — | — | — | — | — | — | — | — | — | — | — |
| 98 | — | — | — | — | — | — | — | — | — | — | — | — | — |
| 99 | — | — | — | — | — | — | — | — | — | — | — | — | — |

We claim:

1. An olefin polymerization process, the process comprising:
   contacting a catalyst composition with an olefin monomer and optionally an olefin comonomer under polymerization conditions to produce an olefin polymer having less than about 0.002 long chain branches per 1000 total carbon atoms, wherein the catalyst composition comprises:
   (i) an activator; and
   (ii) an ansa-metallocene compound having formula (I):

$$E(Cp^A R^A_m)(Cp^B R^B_n)MX_q \quad (I),$$

wherein:
   M is Ti, Zr, Hf, Cr, Sc, Y, La, or a lanthanide;
   $Cp^A$ and $Cp^B$ independently are a cyclopentadienyl, indenyl, or fluorenyl group;
   each $R^A$ and $R^B$ independently is H or a hydrocarbyl, hydrocarbylsilyl, hydrocarbylamino, or hydrocarbyloxide group having up to 18 carbon atoms;
   E is a bridging chain of 3 to 8 carbon atoms or 2 to 8 silicon, germanium, or tin atoms, wherein any substituents on atoms of the bridging chain independently are H or a hydrocarbyl group having up to 18 carbon atoms;
   each X independently is F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;
   m is 0, 1, 2, 3, or 4;
   n is 0, 1, 2, 3, or 4;
   q is 2 when M is Ti, Zr, or Hf; and
   q is 1 when M is Cr, Sc, Y, La, or a lanthanide.

2. The process of claim 1, wherein the process is conducted in the presence of added hydrogen in a range from about 50 ppm to about 1000 ppm; and wherein:
   a Mw/Mn ratio of an olefin polymer produced by the process in the presence of an olefin comonomer is at least 25% greater than a Mw/Mn ratio of an olefin polymer produced by the process under the same polymerization conditions without an olefin comonomer; or
   a Mw of an olefin polymer produced by the process in the presence of an olefin comonomer is at least 50% greater than a Mw of an olefin polymer produced by the process under the same polymerization conditions without an olefin comonomer; or
   both.

3. The process of claim 1, wherein the process is conducted in the presence of added hydrogen and the olefin comonomer; and wherein:
   a Mw of the olefin polymer is substantially constant over a range of from about 50 ppm to about 1000 ppm added hydrogen; or
   an activity of the catalyst composition is substantially constant over a range of from about 50 ppm to about 1000 ppm added hydrogen; or
   both.

4. The process of claim 1, wherein a molar ratio of olefin comonomer to olefin monomer is in a range from about 0.001:1 to about 0.2:1.

5. The process of claim 4, wherein:
the process is conducted in the absence of added hydrogen; and
a Mw/Mn ratio of the olefin polymer increases as the molar ratio of olefin comonomer to olefin monomer increases from about 0.001:1 to about 0.06:1.

6. The process of claim 4, wherein an activity of the catalyst composition decreases as the molar ratio of olefin comonomer to olefin monomer increases from about 0.001:1 to about 0.06:1.

7. The process of claim 1, wherein the olefin polymer has:
an average of from 0 to about 5 short chain branches per 1000 total carbon atoms and a density of greater than about 0.92 g/cm$^3$.

8. The process of claim 1, wherein the process is conducted in a batch reactor, slurry reactor, gas-phase reactor, solution reactor, high pressure reactor, tubular reactor, autoclave reactor, or a combination thereof.

9. The process of claim 1, wherein the olefin monomer is ethylene, and the olefin comonomer comprises propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

10. The process of claim 1, wherein the activator comprises an aluminoxane compound, an organoboron or organoborate compound, an ionizing ionic compound, or any combination thereof.

11. The process of claim 1, wherein the activator comprises an activator-support comprising a solid oxide treated with an electron-withdrawing anion, wherein:
the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and
the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, or any combination thereof.

12. The process of claim 1, wherein the catalyst composition further comprises an organoaluminum compound having the formula:
Al(X$^A$)$_p$(X$^B$)$_{3-p}$,
wherein:
X$^A$ is a hydrocarbyl;
X$^B$ is an alkoxide or an aryloxide, a halide, or a hydride; and
p is from 1 to 3, inclusive.

13. The process of claim 1, wherein the ansa-metallocene compound having formula (I) comprises:

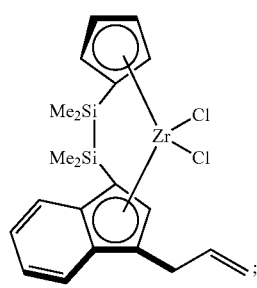

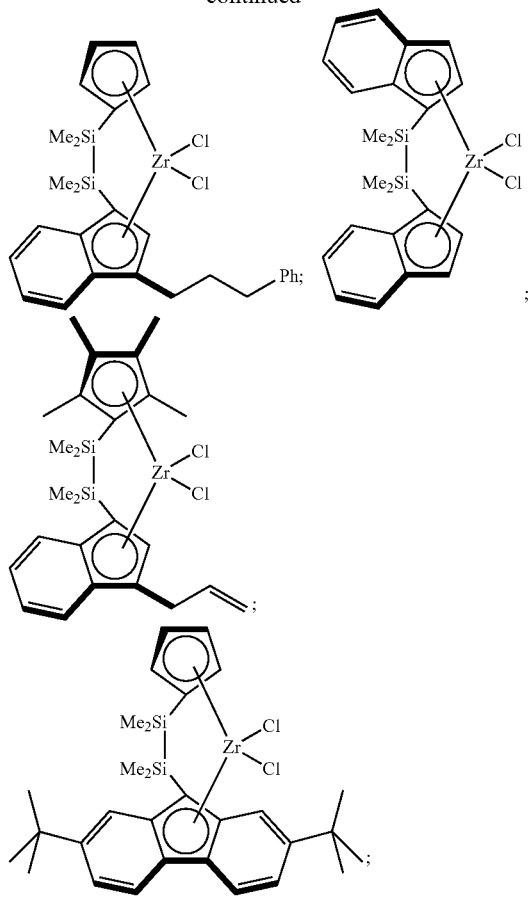

or a combination thereof.

14. A polymerization process, the process comprising:
contacting a catalyst composition with ethylene and optionally an α-olefin comonomer under polymerization conditions to produce an ethylene polymer, wherein the catalyst composition comprises:
(i) an activator; and
(ii) an ansa-metallocene compound having formula (I):

$$E(Cp^A R^A{}_m)(Cp^B R^B{}_n)MX_q \qquad (I),$$

wherein:
M is Ti, Zr, or Hf;
Cp$^A$ and Cp$^B$ independently are a cyclopentadienyl, indenyl, or fluorenyl group;
each R$^A$ and R$^B$ independently is H or a hydrocarbyl, hydrocarbylsilyl, hydrocarbylamino, or hydrocarbyloxide group having up to 18 carbon atoms;
E is —SiMe$_2$—SiMe$_2$—;
each X independently is F; Cl; Br; I; methyl; benzyl; phenyl; H; BH$_4$; OBR$_2$ or SO$_3$R, wherein R is an alkyl or aryl group having up to 18 carbon atoms; or a hydrocarbyloxide group, a hydrocarbylamino group, or a hydrocarbylsilyl group, any of which having up to 18 carbon atoms;
m is 0, 1, 2, 3, or 4;
n is 0, 1, 2, 3, or 4; and
q is 2.

15. The process of claim 14, wherein:
the catalyst composition further comprises an organoaluminum compound;

the activator comprises an activator-support comprising a solid oxide treated with an electron-withdrawing anion; and the α-olefin comonomer comprises 1-butene, 1-hexene, 1-octene, or a combination thereof.

16. The process of claim 14, wherein the process is conducted in the presence of added hydrogen in a range from about 50 ppm to about 1000 ppm; and wherein:
a Mw/Mn ratio of an ethylene polymer produced by the process in the presence of an α-olefin comonomer is at least 25% greater than a Mw/Mn ratio of an ethylene polymer produced by the process under the same polymerization conditions without an α-olefin comonomer; or
a Mw of an ethylene polymer produced by the process in the presence of an α-olefin comonomer is at least 50% greater than a Mw of an ethylene polymer produced by the process under the same polymerization conditions without an α-olefin comonomer; or
both.

17. The process of claim 14, wherein the process is conducted in the presence of added hydrogen and the α-olefin comonomer, and wherein:
a Mw of the ethylene polymer is substantially constant over a range of from about 50 ppm to about 1000 ppm added hydrogen; or
an activity of the catalyst composition is substantially constant over a range of from about 100 ppm to about 500 ppm added hydrogen; or
both.

18. The process of claim 14, wherein a molar ratio of α-olefin comonomer to ethylene is in a range from about 0.001:1 to about 0.2:1.

19. The process of claim 18, wherein:
the process is conducted in the absence of added hydrogen; and
a Mw/Mn ratio of the ethylene polymer increases as the molar ratio of α-olefin comonomer to ethylene increases from about 0.001:1 to about 0.06:1.

20. The process of claim 18, wherein an activity of the catalyst composition decreases as the molar ratio of α-olefin comonomer to ethylene increases from about 0.001:1 to about 0.06:1.

21. The process of claim 14, wherein:
M is Zr or Hf;
$Cp^A$ is a cyclopentadienyl or indenyl group;
$Cp^B$ is an indenyl or fluorenyl group;
each $R^A$ and $R^B$ independently is H or a hydrocarbyl group having up to 12 carbon atoms;
m is 0, 1, or 2; and
n is 0, 1, or 2.

22. The process of claim 21, wherein:
M is Zr;
$Cp^A$ is a cyclopentadienyl or indenyl group;
$Cp^B$ is an indenyl group;
each $R^A$ and $R^B$ independently is H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; and
each X independently is F, Cl, Br, I, methyl, benzyl, or phenyl.

23. A polymerization process, the process comprising:
contacting a catalyst composition with ethylene and an α-olefin comonomer under polymerization conditions to produce an ethylene polymer, wherein a Mw of the ethylene polymer is substantially constant over a range of from about 50 ppm to about 1000 ppm added hydrogen, and/or an activity of the catalyst composition is substantially constant over a range of from about 100 ppm to about 500 ppm added hydrogen, wherein the catalyst composition comprises:

(i) an activator-support comprising a solid oxide treated with an electron-withdrawing anion; and (ii) an ansa-metallocene compound having formula (II), (III), (IV), (V), (VI), or (VII):

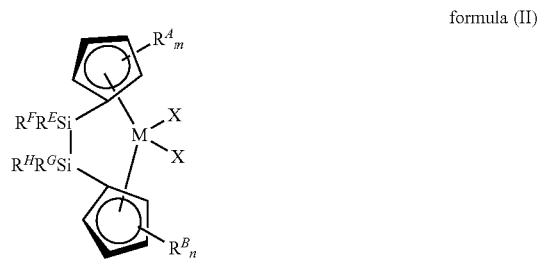

formula (II)

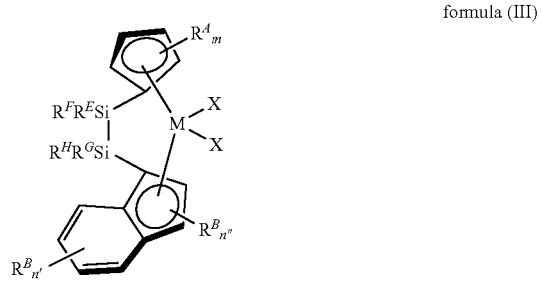

formula (III)

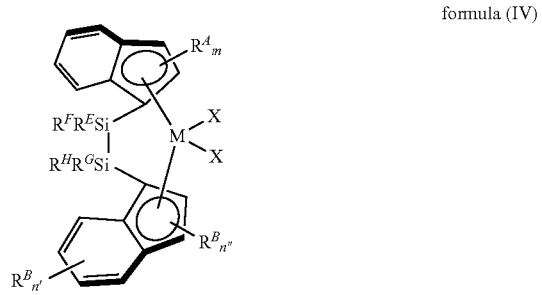

formula (IV)

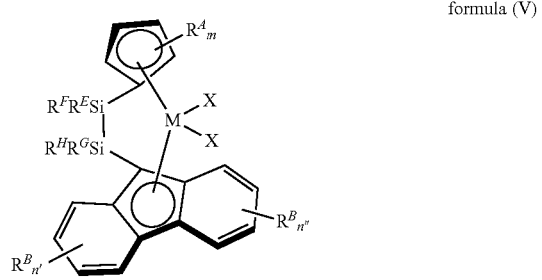

formula (V)

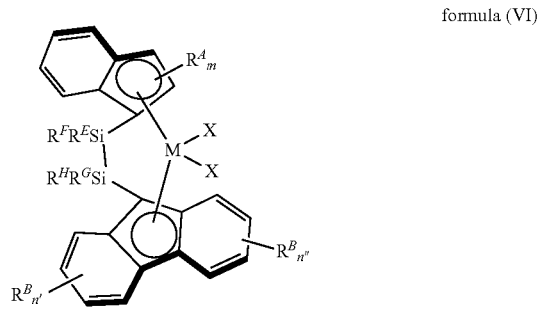

formula (VI)

-continued formula (VII)

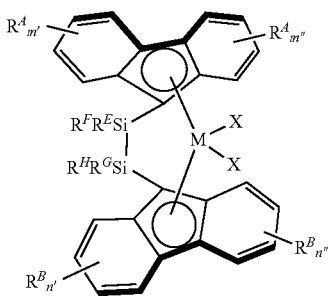

wherein:
M is Ti, Zr, or Hf;
each $R^A$ and $R^B$ independently is a H or a hydrocarbyl, hydrocarbylsilyl, hydrocarbylamino, or hydrocarbyloxide group having up to 18 carbon atoms;
each X independently is F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;
each m is 0, 1, 2, 3, or 4, m' is 0, 1 or 2, and m" is 0, 1, or 2;
each n is 0, 1, 2, 3, or 4, each n' is 0, 1, or 2, and each n" is 0, 1, or 2; and
each $R^E$, $R^F$, $R^G$, and $R^H$ independently is H or a hydrocarbyl group having up to 18 carbon atoms.

24. The process of claim 23, wherein the process is conducted in the presence of added hydrogen, and wherein:
the catalyst composition further comprises an organoaluminum compound;
the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof;
the α-olefin comonomer comprises 1-butene, 1-hexene, 1-octene, or a combination thereof;
M is Zr or Hf;
each $R^A$ and $R^B$ independently is H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl;
each X independently is F, Cl, Br, I, methyl, benzyl, or phenyl;
each m is 0, 1, or 2, m' is 0 or 1, and m" is 0 or 1;
each n is 0, 1, or 2, each n' is 0 or 1, and each n" is 0 or 1; and
each $R^E$, $R^F$, $R^G$, and $R^H$ independently is H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl.

* * * * *